United States Patent
Li et al.

(10) Patent No.: US 11,622,268 B2
(45) Date of Patent: Apr. 4, 2023

(54) SECURE COMMUNICATION METHOD AND SECURE COMMUNICATIONS APPARATUS

(71) Applicant: Huawei Technologies Co., Ltd., Shenzhen (CN)

(72) Inventors: He Li, Shanghai (CN); Jing Chen, Shanghai (CN); Huan Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 195 days.

(21) Appl. No.: 16/874,064

(22) Filed: May 14, 2020

(65) Prior Publication Data

US 2020/0275269 A1    Aug. 27, 2020

Related U.S. Application Data

(63) Continuation of application No. PCT/CN2018/116041, filed on Nov. 16, 2018.

(30) Foreign Application Priority Data

Nov. 17, 2017  (CN) .......................... 201711147451.8

(51) Int. Cl.
*H04W 12/06* (2021.01)
*H04W 12/04* (2021.01)
(Continued)

(52) U.S. Cl.
CPC ........... *H04W 12/06* (2013.01); *H04W 12/04* (2013.01); *H04W 12/60* (2021.01); *H04W 48/08* (2013.01); *H04W 80/02* (2013.01); *H04W 84/042* (2013.01)

(58) Field of Classification Search
CPC ..... H04W 12/06; H04W 12/60; H04W 12/04; H04W 48/08; H04W 12/0433; H04L 9/0891
(Continued)

(56) References Cited

U.S. PATENT DOCUMENTS

| 2011/0004762 A1 | 1/2011 | Horn |
| 2015/0104020 A1 | 4/2015 | Chen et al. |

(Continued)

FOREIGN PATENT DOCUMENTS

| CN | 101610147 A | 12/2009 |
| CN | 101983517 A | 3/2011 |

(Continued)

OTHER PUBLICATIONS

3GPP TR 33.899 V1.3.0, "3rd Generation Partnership Project; Technical Specification Group Services and System Aspects;Study on the security aspects of the next generation system (Release 14)," Aug. 2017, 605 pages.
(Continued)

*Primary Examiner* — Jacob Lipman
(74) *Attorney, Agent, or Firm* — Conley Rose, P.C.

(57) ABSTRACT

A secure communication method and a secure communications apparatus related to the field of communications technologies and applied to a terminal. The terminal has a first security context and a second security context, the first security context is used by the terminal to communicate with a first network, the second security context is used by the terminal to communicate with a second network, and the first security context and the second security context include different first information.

20 Claims, 11 Drawing Sheets

(51) Int. Cl.
*H04W 48/08* (2009.01)
*H04W 12/60* (2021.01)
*H04W 80/02* (2009.01)
*H04W 84/04* (2009.01)

(58) Field of Classification Search
USPC .......................................................... 726/3
See application file for complete search history.

(56) References Cited

U.S. PATENT DOCUMENTS

| | | | | |
|---|---|---|---|---|
| 2015/0236851 | A1* | 8/2015 | Bi | H04L 9/3268 380/282 |
| 2016/0127896 | A1* | 5/2016 | Lee | H04W 12/06 455/411 |
| 2016/0323737 | A1 | 11/2016 | Fransen | |
| 2017/0171752 | A1* | 6/2017 | Lee | H04W 76/10 |
| 2018/0352483 | A1* | 12/2018 | Youn | H04W 76/11 |
| 2019/0289672 | A1* | 9/2019 | Ben Henda | H04W 88/10 |

FOREIGN PATENT DOCUMENTS

| | | |
|---|---|---|
| CN | 102378168 A | 3/2012 |
| CN | 102014381 B | 12/2012 |
| CN | 104935426 A | 9/2015 |
| CN | 105451284 A | 3/2016 |
| CN | 105704716 A | 6/2016 |
| EP | 2566205 B1 | 3/2019 |

OTHER PUBLICATIONS

3GPP TS 33.401 V15.1.0 "3rd Generation Partnership Project; Technical Specification Group Services and System Aspects; 3GPP System Architecture Evolution (SAE); Security architecture (Release 15)," Sep. 2017, 161 pages.

3GPP TS 33.501 V0.4.0, "3rd Generation Partnership Project; Technical Specification Group Services and System Aspects; Security Architecture and Procedures for 5G System (Release 15)," Oct. 2017, 70 pages.

SA WG2 Meeting #122bis, S2-176075, "TS 23.502 Update on Registration procedure," ZTE, Aug. 21-25, 2017, Sophia Antipolis, France, 8 pages.

3GPP TSG SA WG3 (Security) Meeting #88, S3-172010, "pCR to provide a normative text for the AMF key derivation/refresh," Aug. 7-11, 2017, Dali, China, 2 pages.

3GPP TSG SA WG3 (Security) Meeting #88Bis Adhoc,S3-172390, "PCR: Security for Non-3GPP access to 5GC," Oct. 9-13, 2017, Singapore, 5 pages.

3GPP TSG SA WG3 (Security) Meeting #88Bis, S3-172481, Ericsson, "Security for multiple NAS connections with single anchor key," Oct. 9-13, 2017, Singapore, 2 pages.

3GPP TS 23.501 V1.5.0, Nov. 2017, "3rd Generation Partnership Project; Technical Specification Group Services and System Aspects; System Architecture for the 5G System; Stage 2 (Release 15)," 170 pages.

3GPP TS 24.501 V0.1.0, Nov. 2017, "3rd Generation Partnership Project; Technical Specification Group Core Network and Terminals; Non-Access-Stratum (NAS) protocol for 5G System (5GS); Stage 3 (Release 15)," 16 pages.

J. Arkko et al., "Improved Extensible Authentication Protocol Method for 3rd Generation Authentication and Key Agreement (EAP-AKA)," RFC 5448, May 2009, 29 pages.

Qualcomm Incorporated, "23.501—Roaming considerations for non-3GPP access support," SA WG2 Meeting #S2-119, Feb. 13 -17, 2017, Dubrovnik, Croatia, S2-171304, 7 pages.

Nokia, Alcatel-Lucent Shanghai Bell, "23.501: Corrections in the AMF procedures for Non-3GPP," SA WG2 Meeting £120, Mar. 27-31, 2017, Busan, South Korea , S2-172717, 4 pages.

OTD, "TS 23.501: P-CR for Proposed changes to Clause 5.3.2.4 on Use of Temporary and Permanent Identifiers," SA WG2 Meeting #121, May 15-19, 2017, Hangzhou, China, S2-173950, 2 pages.

* cited by examiner

SECURE COMMUNICATION METHOD AND SECURE COMMUNICATIONS APPARATUS

CROSS-REFERENCE TO RELATED APPLICATIONS

This application is a continuation of International Patent Application No. PCT/CN2018/116041 filed on Nov. 16, 2018, which claims priority to Chinese Patent Application No. 201711147451.8 filed on Nov. 17, 2017. The disclosures of the aforementioned applications are hereby incorporated by reference in their entireties.

TECHNICAL FIELD

Embodiments of this application relate to the field of communications technologies, and in particular, to a secure communication method and a secure communications apparatus.

BACKGROUND

Currently, a main radio access technology includes a 3rd Generation Partnership Project (3GPP) radio access technology. The access technology evolved gradually from second generation (2G), and has evolved from a Long-Term Evolution (LTE) (also referred to as fourth generation (4G)) technology to a New Radio (NR) (also referred to as fifth generation (5G)) technology.

In 4G and previous access technologies, the 3GPP access technology and a non-3GPP access technology are independent of each other. Therefore, communication security processing of the two access technologies is also independent of each other and does not affect each other. With technology evolution, in the NR technology or a future technology, the non-3GPP access technology may be used to access a 3GPP core network. Therefore, communication security processing needs to be further improved in order to improve a secure communication capability of a terminal when the terminal accesses a wireless network using different radio access technologies.

SUMMARY

Embodiments of this application provide a secure communication method and a secure communications apparatus in order to improve a secure communication capability of a terminal when the terminal accesses a wireless network using different radio access technologies.

To resolve the foregoing technical issue, the embodiments of this application provide the following technical solutions.

According to a first aspect, this application provides a secure communication method, applied to a terminal. The terminal has a first security context and a second security context, the first security context is used by the terminal to communicate with a first network, the second security context is used by the terminal to communicate with a second network, and the first security context and the second security context include different first information. The method provided in this application includes, when communicating with a target network, determining, by the terminal, a target security context based on the first information, where when the target network is the first network, the target security context is the first security context, or when the target network is the second network, the target security context is the second security context, and communicating, by the terminal, with the target network based on the target security context.

According to the secure communication method provided in this application, when the terminal accesses different networks using different access technologies, for example, the first network and the second network, there may be the following cases The different networks belong to a same operator, or the different networks belong to different operators. Regardless of whether the different networks belong to a same operator, there may be the following problem. The terminal device obtains a same key identifier from the different networks. Generally, a function of the key identifier is to identify a key. The network may usually use the key to establish a security context based on a preset algorithm and a parameter such as non-access stratum (NAS) COUNT. Therefore, if key identifiers obtained by the terminal from different access and mobility management functions (AMFs) are the same, keys determined by the terminal based on the key identifiers may also be the same. When the terminal accesses the network again, the terminal does not know which security context is to be selected for communicating with a network that needs to be accessed. Based on this, in this application, the first security context and the second security context on the terminal side include different first information. In this way, when communicating with the target network, the terminal may determine, based on the first information, a security context required when communicating with the target network. For example, the terminal may determine, based on the first information, to use the first security context when communicating with the first network, and use the second security context when communicating with the second network such that the terminal can correctly access a corresponding network.

With reference to the first aspect, in a first possible implementation of the first aspect, the first information is at least one of key identifier information and identification information of the terminal. Further, the identification information of the terminal is generated by a network accessed by the terminal. When the terminal accesses different networks, identification information of the terminal generated by the different networks for the terminal is different, and therefore the identification information of the terminal can be used to distinguish between the first security context and the second security context. In addition, when the first network and the second network belong to a same operator, the networks belonging to the same operator can interact with each other. Key identifier information between different networks and the terminal is different, and therefore the key identifier information can be used to distinguish between the first security context and the second security context. Moreover, when the first network and the second network belong to different operators, the networks belonging to the different operators may be unable to interact with each other. Same key identifier information may be generated in different networks, and therefore the identification information of the terminal may further be used to distinguish between the first security context and the second security context.

With reference to the first aspect or the first possible implementation of the first aspect, in a second possible implementation of the first aspect, the first security context and the second security context further include different second information, and the second information is used to indicate access technologies of networks corresponding to the first security context and the second security context. For example, the second information included in the first security context may be an access technology of the first network, and the second information included in the second security context may be an access technology of the second network. The second information used to indicate the access technology is added to the first security context and the second security context such that the terminal can determine a network corresponding to the security context based on the access technology, thereby correctly accessing the corresponding network.

With reference to any one of the first aspect to the second possible implementation of the first aspect, in a third possible implementation of the first aspect, the first information is indication information, and the indication information is used to indicate an access technology of a network corresponding to a security context.

With reference to any one of the first aspect to the third possible implementation of the first aspect, in a fourth possible implementation of the first aspect, the first security context does not include a user plane (UP) key, and the second security context includes a UP key, or the first security context includes a UP key, and the second security context does not include a UP key. When the terminal accesses a network using a 3GPP access technology, a security context between the terminal and the network usually includes a UP key. When the terminal gains access using a non-3GPP access technology, a security context usually may not include a UP key. Therefore, the terminal may also use the UP key to distinguish between networks corresponding to security contexts.

With reference to any one of the first aspect to the fourth possible implementation of the first aspect, in a fifth possible implementation of the first aspect, before communicating, by the terminal, with the target network, the method provided in this application further includes when the terminal registers with the first network, determining, by the terminal, the first security context, or when the terminal registers with the second network, determining, by the terminal, the second security context.

With reference to any one of the first aspect to the fifth possible implementation of the first aspect, in a sixth possible implementation of the first aspect, determining, by the terminal, the first security context includes receiving, by the terminal, first key identifier information from a first network device, and generating, by the terminal, the first security context that includes the first key identifier information, where the first key identifier information is used to identify the first security context.

With reference to any one of the first aspect to the sixth possible implementation of the first aspect, in a seventh possible implementation of the first aspect, determining, by the terminal, the second security context includes receiving, by the terminal, second key identifier information from a second network device, and generating, by the terminal, the second security context that includes the second key identifier information, where the second key identifier information is used to identify the second security context.

With reference to any one of the first aspect to the seventh possible implementation of the first aspect, in an eighth possible implementation of the first aspect, the receiving, by the terminal, key identifier information from a network device includes receiving, by the terminal, a NAS security mode command (SMC) message sent by the network device, where the NAS SMC message includes the first key identifier information, or receiving, by the terminal from the network device, a message used to indicate that authentication on the terminal succeeds, where the message used to indicate that authentication on the terminal succeeds includes the key identifier information, or receiving, by the terminal, a NAS SMC message sent by the network device, where the NAS SMC message includes a message used to indicate that authentication on the terminal succeeds, and the message used to indicate that authentication on the terminal succeeds includes the key identifier information.

With reference to any one of the first aspect to the eighth possible implementation of the first aspect, in a ninth possible implementation of the first aspect, before communicating, by the terminal, with the target network, the method provided in this application further includes determining, by the terminal, whether a first identifier of a third network is the same as a first identifier of the target network, where the third network is a network currently accessed by the terminal.

According to a second aspect, this application provides a secure communication method, including obtaining, by a first network device, key identifier information, where the key identifier information is used to identify a security context, and sending, by the first network device, the key identifier information to a terminal when authentication on the terminal is completed on a network side.

With reference to the second aspect, in a first possible implementation of the second aspect, the obtaining, by a first network device, key identifier information includes generating, by the first network device, the key identifier information after receiving a message used to indicate that authentication on the terminal succeeds.

With reference to the second aspect or the first possible implementation of the second aspect, in a second possible implementation of the second aspect, obtaining, by a first network device, key identifier information includes receiving, by the first network device, the message used to indicate that authentication on the terminal succeeds, where the message used to indicate that authentication on the terminal succeeds includes the key identifier information.

With reference to any one of the second aspect to the second possible implementation of the second aspect, in a third possible implementation of the second aspect, before obtaining, by a first network device, key identifier information, the method provided in this application further includes obtaining, by the first network device, a plurality of pieces of key identifier sub-information, where all the plurality of pieces of key identifier sub-information come from another network device, or some of the plurality of pieces of key identifier sub-information are generated by the first network device, and some of the plurality of pieces of key identifier sub-information come from another network device, and obtaining, by a first network device, key identifier information includes generating, by the first network device, the key identifier information based on the plurality of pieces of key identifier sub-information.

With reference to any one of the second aspect to the third possible implementation of the second aspect, in a fourth possible implementation of the second aspect, the first network device is an AMF or a security anchor function (SEAF).

With reference to any one of the second aspect to the fourth possible implementation of the second aspect, in a fifth possible implementation of the second aspect, the first network device is an AMF, and the sending, by the first network device, the key identifier information to a terminal includes sending, by the first network device, the key identifier information to the terminal using a NAS SMC message.

With reference to any one of the second aspect to the fifth possible implementation of the second aspect, in a sixth possible implementation of the second aspect, the NAS SMC message includes the message used to indicate that authentication on the terminal succeeds, and the message used to indicate that authentication on the terminal succeeds includes the key identifier information.

With reference to any one of the second aspect to the sixth possible implementation of the second aspect, in a seventh possible implementation of the second aspect, the first network device is an authentication server function (AUSF), and obtaining, by a first network device, key identifier information and sending the key identifier information to a terminal includes generating, by the first network device, the message that includes the key identifier information and that is used to indicate that authentication on the terminal succeeds, and sending, to the terminal, the message used to indicate that authentication on the terminal succeeds.

Correspondingly, according to a third aspect, this application provides a secure communications apparatus, and the secure communications apparatus can implement the secure communication method in any one of the first aspect or the possible implementations of the first aspect. For example, the secure communications apparatus may be a terminal or a chip disposed in the terminal. The secure communications apparatus can implement the foregoing method using software or hardware, or using hardware executing corresponding software.

In a possible design, the secure communications apparatus has a first security context and a second security context, the first security context is used by the secure communications apparatus to communicate with a first network, the second security context is used by the secure communications apparatus to communicate with a second network, and the first security context and the second security context include different first information. The secure communications apparatus includes a determining unit configured to when the secure communications apparatus communicates with a target network, determine a target security context based on the first information, where when the target network is the first network, the target security context is the first security context, or when the target network is the second network, the target security context is the second security context, and a communications unit configured to communicate with the target network based on the target security context determined by the determining unit.

In a possible design, the first information is at least one of key identifier information and identification information of the terminal.

In a possible design, the first security context and the second security context further include different second information, and the second information is used to indicate an access technology of a network corresponding to a security context.

In a possible design, the first information is indication information, and the indication information is used to indicate an access technology of a network corresponding to a security context.

In a possible design, the first security context does not include a UP key, and the second security context includes a UP key, or the first security context includes a UP key, and the second security context does not include a UP key.

In a possible design, the determining unit is further configured to when the terminal registers with the first network, determine the first security context, and when the terminal registers with the second network, determine the second security context.

In a possible design, the secure communications apparatus further includes a receiving unit configured to receive first key identifier information from a first network device, and a generating unit configured to generate the first security context that includes the first key identifier information, where the first key identifier information is used to identify the first security context.

In a possible design, the receiving unit is further configured to receive second key identifier information from a second network device, and the generating unit is further configured to generate the second security context that includes the second key identifier information, where the second key identifier information is used to identify the second security context.

In a possible design, the receiving unit is configured to receive a NAS SMC message sent by a network device, where the NAS SMC message includes the first key identifier information, or the receiving unit is configured to receive a NAS SMC message sent by a network device, where the NAS SMC message includes a message used to indicate that authentication on the terminal succeeds, and the message used to indicate that authentication on the terminal succeeds includes the key identifier information.

In a possible design, the determining unit is further configured to before the secure communications apparatus communicates with the target network, determine whether a first identifier of a third network is the same as a first identifier of the target network, where the third network is a network currently accessed by the terminal.

According to a fourth aspect, a secure communications apparatus may include at least one processor and a communications interface. The processor is configured to support the secure communications apparatus in performing an operation related to message processing or control performed on the secure communications apparatus side in the method described in any one of the first aspect or the possible implementations of the first aspect. The communications interface is configured to support communication between the secure communications apparatus and another network element (for example, a network device). The communications interface may be a transceiver circuit, and the transceiver circuit is configured to support the secure communications apparatus in performing operations related to message receiving and sending performed on the secure communications apparatus side in the method described in any one of the first aspect or the possible implementations of the first aspect.

Optionally, the secure communications apparatus may further include a memory, where the memory is configured to be coupled to the at least one processor, and the memory stores a program (instruction) and data that are necessary for the secure communications apparatus. Optionally, the secure communications apparatus may further include a bus, and the memory, the transceiver circuit, and the at least one processor are interconnected through the bus.

According to a fifth aspect, this application provides a first network device, including an obtaining unit configured to obtain key identifier information, where the key identifier information is used to identify a security context, and a sending unit configured to send the key identifier information to a terminal when authentication on the terminal is completed on a network side.

With reference to the fifth aspect, in a first possible implementation of the fifth aspect, the obtaining unit is configured to generate the key identifier information after a message used to indicate that authentication on the terminal succeeds is received.

With reference to the fifth aspect or the first possible implementation of the fifth aspect, in a second possible implementation of the fifth aspect, the apparatus further includes a receiving unit configured to receive the message used to indicate that authentication on the terminal succeeds, where the message used to indicate that authentication on the terminal succeeds includes the key identifier information.

With reference to any one of the fifth aspect to the second possible implementation of the fifth aspect, in a third possible implementation of the fifth aspect, the obtaining unit is configured to obtain a plurality of pieces of key identifier sub-information, where all the plurality of pieces of key identifier sub-information come from another network device, or some of the plurality of pieces of key identifier sub-information are generated by the first network device, and some of the plurality of pieces of key identifier sub-information come from another network device, and generate the key identifier information based on the plurality of pieces of key identifier sub-information.

With reference to any one of the fifth aspect to the third possible implementation of the fifth aspect, in a fourth possible implementation of the fifth aspect, the first network device is an AMF or a SEAF.

With reference to any one of the fifth aspect to the fourth possible implementation of the fifth aspect, in a fifth possible implementation of the fifth aspect, the first network device is an AMF, and the sending unit is further configured to send the key identifier information to the terminal using a NAS SMC message.

With reference to any one of the fifth aspect to the fifth possible implementation of the fifth aspect, in a sixth possible implementation of the fifth aspect, the NAS SMC message includes the message used to indicate that authentication on the terminal succeeds, and the message used to indicate that authentication on the terminal succeeds includes the key identifier information.

With reference to any one of the fifth aspect to the sixth possible implementation of the fifth aspect, in a seventh possible implementation of the fifth aspect, the first network device is an AUSF, and the obtaining, by a first network device, key identifier information and sending the key identifier information to a terminal includes the obtaining unit is configured to generate the message that includes key identifier information and that is used to indicate that authentication on the terminal succeeds, and the sending unit is configured to send, to the terminal, the message used to indicate that authentication on the terminal succeeds.

According to a sixth aspect, a secure communications apparatus may include at least one processor and a communications interface. The processor is configured to support the secure communications apparatus in performing an operation related to message processing or control performed on the secure communications apparatus side in the method described in any one of the second aspect or the possible implementations of the second aspect. The communications interface is configured to support communication between the secure communications apparatus and another network element (for example, a terminal). The communications interface may be a transceiver, and the transceiver is configured to support the secure communications apparatus in performing operations related to message receiving and sending performed on the secure communications apparatus side in the method described in any one of the second aspect or the possible implementations of the second aspect.

Optionally, the secure communications apparatus may further include a memory, where the memory is configured to be coupled to the at least one processor, and the memory stores a program (instruction) and data that are necessary for the secure communications apparatus. The memory, the transceiver, and the at least one processor are interconnected through a line.

According to a seventh aspect, this application provides a computer-readable storage medium. When the computer-readable storage medium is applied to a terminal, the computer-readable storage medium stores an instruction. When the instruction is run, a computer is enabled to perform the secure communication method described in any one of the first aspect or the possible implementations of the first aspect.

According to an eighth aspect, this application provides a computer-readable storage medium. When the computer-readable storage medium is applied to a network device, the computer-readable storage medium stores an instruction. When the instruction is run, a computer is enabled to perform the secure communication method described in any one of the second aspect or the possible implementations of the second aspect.

According to a ninth aspect, this application provides a chip system, applied to a terminal. The chip system includes at least one processor and an interface circuit, the interface circuit and the at least one processor are interconnected through a line, and the processor is configured to run an instruction stored in the chip system, to perform the secure communication method described in any one of the first aspect or the possible implementations of the first aspect.

According to a tenth aspect, this application provides a chip system, applied to a network device. The chip system includes at least one processor and an interface circuit, the interface circuit and the at least one processor are interconnected through a line, and the processor is configured to run an instruction stored in the chip system, to perform the secure communication method described in any one of the second aspect or the possible implementations of the second aspect.

Optionally, the chip system in this application further includes at least one memory, and the at least one memory stores an instruction.

According to an eleventh aspect, this application provides a computer program product including an instruction. The computer program product stores an instruction. When the instruction is run, a terminal is enabled to perform the secure communication method described in the first aspect or any possible design of the first aspect.

According to a twelfth aspect, this application provides a computer program product including an instruction. The computer program product stores an instruction. When the instruction is run, a network device is enabled to perform the secure communication method described in the second aspect or any possible design of the second aspect.

According to a thirteenth aspect, this application provides a communications system. The communications system includes at least one terminal described in the third aspect or the fourth aspect and at least one network device described in the fifth aspect or the sixth aspect.

In a possible design, the system may further include another device interacting with the network device or the terminal in the solutions provided in the embodiments of this application.

DESCRIPTION OF EMBODIMENTS

"Of", "corresponding", "relevant", and "related" may be interchangeably used sometimes in this application. It should be noted that expressed meanings are consistent when no differences are emphasized.

It should be noted that, in the embodiments of this application, the term such as "example" or "for example" is used to represent giving an example, an illustration, or a description. Any embodiment or design scheme described as "example" or "for example" in the embodiments of this application should not be interpreted as being preferred or having advantages over another embodiment or design scheme. Exactly, use of the term such as "example" or "for example" is intended to present a relative concept in a specific manner.

In the embodiments of this application, at least one refers to one or more, and "a plurality of" refers to at least two. "and/or" describes an association relationship for describing associated objects and represents that three relationships may exist. For example, A and/or B may represent only A exists, both A and B exist, and only B exists. A and B may be in a singular or plural form. The character "/" generally indicates an "or" relationship between the associated objects. "At least one of the following items" or a similar expression means any combination of these items, including a single item or any combination of a plurality of items. For example, at least one of a, b, or c may represent a, b, c, a-b, a-c, b-c, or a-b-c, where a, b, and c may be in a singular or plural form. In addition, for clear description of the technical solutions in the embodiments of this application, terms such as "first" and "second" are used in the embodiments of this application to distinguish between same items or similar items that have basically a same function or purpose. A person skilled in the art can understand that the terms such as "first" and "second" do not limit a quantity or an execution sequence, and the terms such as "first" and "second" do not mean being definitely different either.

A network architecture and a service scenario that are described in the embodiments of this application are intended to describe the technical solutions in the embodiments of this application more clearly, and constitute no limitation on the technical solutions provided in the embodiments of this application. A person of ordinary skill in the art can know that With evolution of the network architecture and emergence of new service scenarios, the technical solutions provided in the embodiments of this application are also applicable to similar technical issues.

Figure 1:
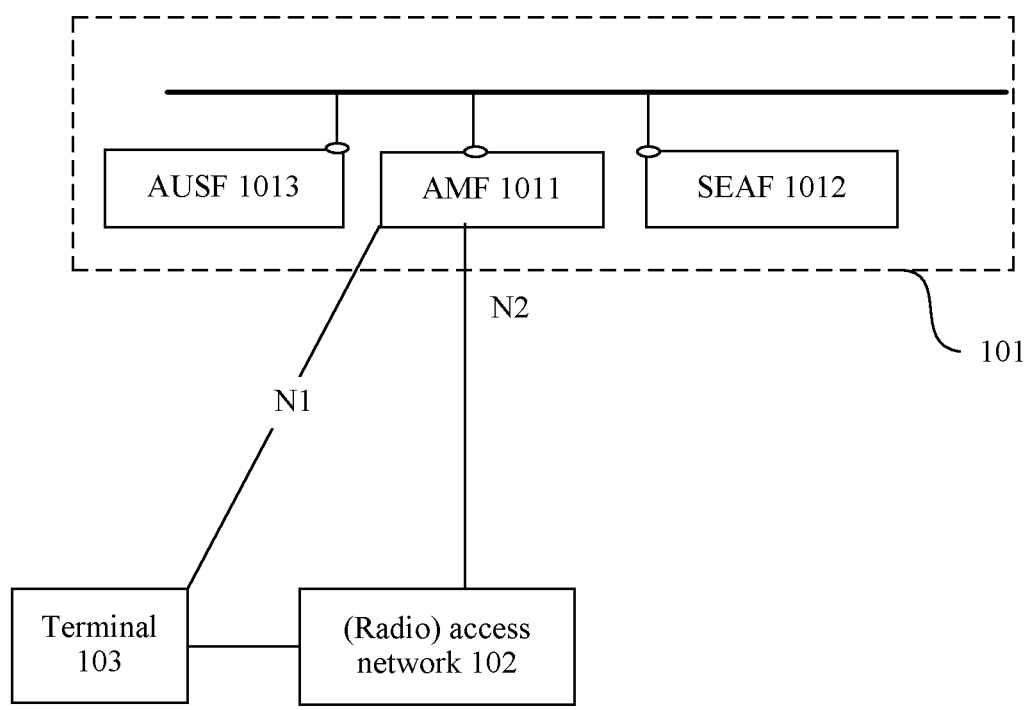
FIG. 1 is a structural diagram of a communications system according to an embodiment of this application.

FIG. 1 is an architectural diagram of a communications system according to an embodiment of this application. As shown in FIG. 1, the communications system includes a core network 101 and an access network (AN) 102. A terminal 103 accesses a service network using the access network 102, and obtains a service of an external network (for example, an Internet) using the service network, or communicates with another terminal using the service network. The AN 102 may be an access network that uses different access technologies. For example, the access technologies include a radio access technology and a fixed network access technology. The radio access technology mainly includes two types a 3GPP access technology (for example, a radio access technology used in a 2G, 3G, 4G, or 5G system) and a non-3GPP access technology.

The 3GPP access technology is an access technology that conforms to the 3GPP standard specification. An access network that uses the 3GPP access technology is referred to as a radio access network (RAN). For example, the terminal 103 may use the 3GPP access technology to access a wireless network using an access network device. The access network device may be a base station. For example, an access network device in a 5G system is referred to as a next-generation base station node (gNB), or an evolved NodeB (eNB).

The non-3GPP access technology is a radio access technology that does not conform to the 3GPP standard specification, for example, WI-FI representative of an air interface technology. The access network device may be an access point (AP).

When the terminal 103 accesses the wireless network using different access technologies, the terminal 103 may be connected to different core network devices using different access network devices.

The terminal 103 stores a long-term key and a related function. When performing mutual authentication with a core network device, the terminal 103 performs authenticity authentication on the network using the long-term key and the related function.

The core network 101 may include a plurality of entities, such as an AMF entity 1011, an SEAF entity 1012, and an AUSF entity 1013.

Some or all of the entities in the core network 101 may be physically integrated or may be disposed separately. For example, the SEAF 1012 and the AMF 1011 may be integrated or may be disposed separately. The SEAF 1012 is mainly responsible for initiating an authentication request to the AUSF 1013, and may further complete authentication on the terminal 103 on a network side in an authentication process.

When performing authentication on the terminal 103, the AUSF 1013 is responsible for verifying and transferring a parameter on which authentication is to be performed and performing authenticity authentication on the terminal. For example, the AUSF 1013 receives an authentication request sent by the SEAF 1012, selects an authentication method, and completes authentication on the terminal 103 on the network side.

In addition, the core network may further include other entities, for example, a unified data management (UDM) entity, a session management function (SMF) entity, a UP function (UPF) entity, a policy control function (PCF) entity, an application function (AF) entity, a network capability exposure function (NEF) entity 1019, and a data network (DN). This is not limited in this embodiment of this application. Some or all of these entities may be integrated into one physical device or may be disposed separately.

The UDM is configured to store subscription information of the terminal. The SMF is configured to allocate a session resource and the like to an UP. The UPF is an UP data egress and is connected to an external network. The PCF stores a latest quality of service (QoS) rule. The access network device may allocate a proper resource to a UP transmission path according to the QoS rule provided by the SMF.

The AF network element is located in the DN and is a function network element deployed in a third party. The AF is mainly to notify the PCF of a latest service requirement of a third-party enterprise for an application. The PCF may generate a corresponding QoS rule based on the requirement, to ensure that a service provided by a network satisfies the requirement imposed by the third party.

The NEF is mainly configured to interact with the third party such that the third party can indirectly interact with some network elements in a 3GPP network.

The terminal 103 communicates with the AMF 1011 over an N1 interface, the AN communicates with the UPF over an N3 interface, the UPF communicates with the DN over an N6 interface, and the UPF communicates with the SMF over an N4 interface. It should be noted that names of the interfaces between the network elements in FIG. 1 are merely examples. In specific implementation, the interface names may be other names. This is not further limited in this embodiment of this application.

The terminal may also be referred to as a terminal device, user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (STA) in a wireless local area network (WLAN), or may be a cellular phone, a cordless telephone set, a Session Initiation Protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, a terminal device in a next-generation communications system such as a 5G communications network, a terminal device in a future evolved Public Land Mobile Network (PLMN), or the like.

For example, in the embodiments of this application, the terminal may be a wearable device. The wearable device may also be referred to as a wearable intelligent device, and is a generic term of wearable devices, such as glasses, gloves, watches, clothes, and shoes, developed by performing intelligent design on daily wear using a wearable technology. The wearable device is a portable device directly worn on a human body or integrated into clothes or an accessory of a user. The wearable device is more than a hardware device, and implements powerful functions with the assistance of software support, data interaction, and cloud interaction. In a broad sense, wearable intelligent devices include large-sized devices, for example, a smartwatch or smart glasses, that provide comprehensive functions and that can implement a complete or partial function independent of a smartphone, and include devices, for example, various types of smart bands and smart jewelry for vital sign monitoring, that are intended for only a specific type of application function and that need to be used in conjunction with another device such as a smartphone.

Figure 2:
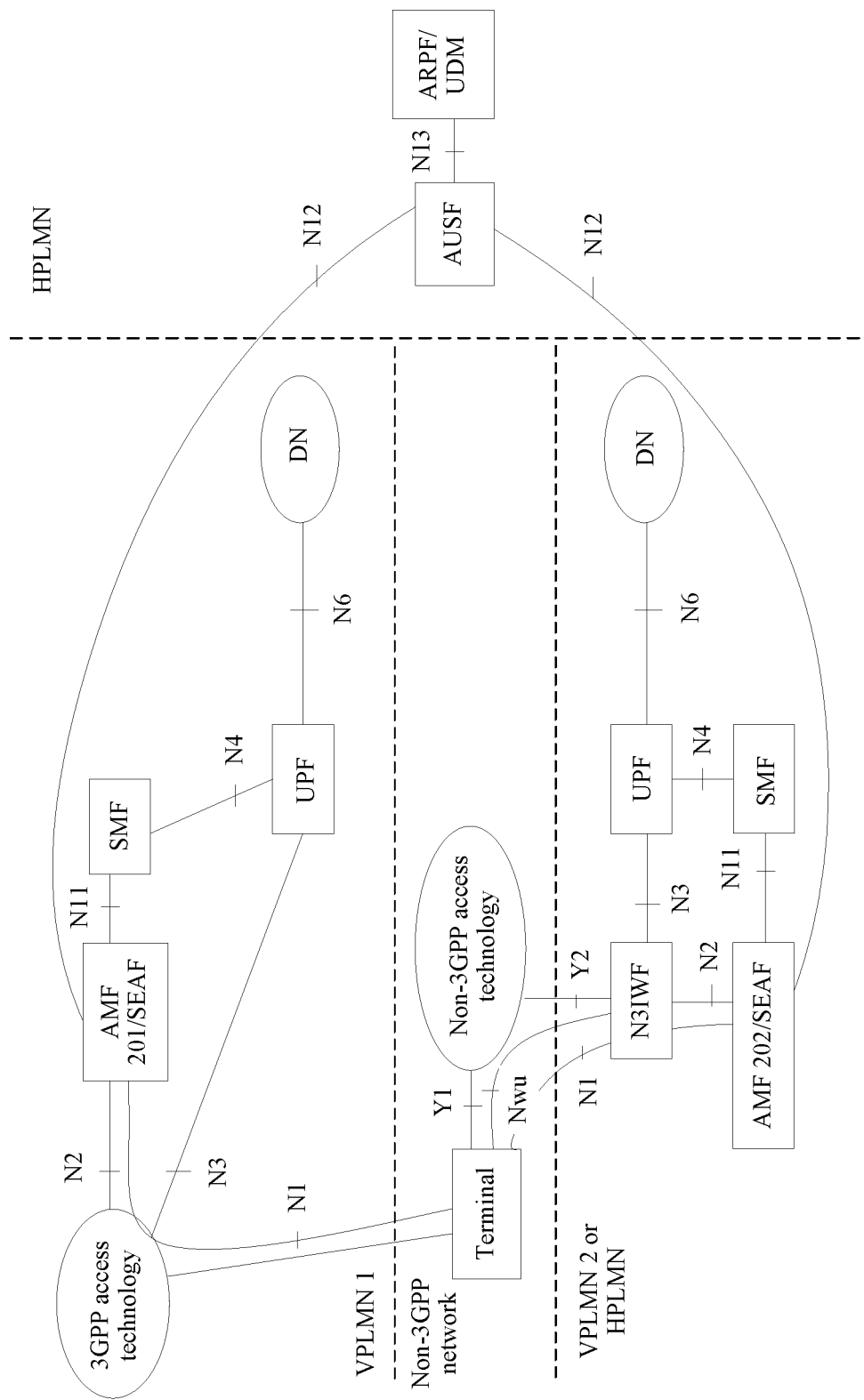
FIG. 2 is a structural diagram of a communications system in which a terminal gains access using different networks according to an embodiment of this application.

FIG. 2 is a schematic diagram of an architecture in which a terminal accesses a network using different radio access technologies according to an embodiment of this application. For example, FIG. 2 shows an architecture in which the terminal uses both a 3GPP access technology and a non-3GPP access technology. As shown in FIG. 2, the terminal can be connected to different AMFs or SEAFs using both the 3GPP access technology and the non-3GPP access technology. For example, as shown in FIG. 2, the terminal accesses an AMF(201)/SEAF using the 3GPP access technology, and the terminal accesses an AMF(202)/SEAF using the non-3GPP access technology. When the terminal accesses different AMFs or SEAFs using different access technologies, usually different AMFs or SEAFs may be corresponding to different SIVIFs or a same SMF. Further, when different AMFs belong to a same network, usually different AMFs or SEAFs may be corresponding to a same SMF. When different AMFs belong to different networks, usually different AMFs or SEAFs may be corresponding to different SIVIFs, different SIVIFs may be corresponding to different UPFs or a same UPF, and different UPFs may be corresponding to different DNs or a same DN. Further, as shown in FIG. 2, when accessing the AMF 202 using the non-3GPP access technology, the terminal may access the AMF 202 using a non-3GPP interworking function (N3IWF) entity. An AUSF and an authentication repository function (ARPF)/UDM constitute a home PLMN (HPLMN). When accessing the network using different access technologies, the terminal may have different visited PLMNs (VPLMNs) or a same visited PLMN. In FIG. 2, different visited PLMNs are used as an example, such as a VPLMN 1 and a VPLMN 2 shown in FIG. 2. For specific functions of network elements shown in FIG. 2, refer to the foregoing embodiment. Details are not described in this application again.

Figure 3:
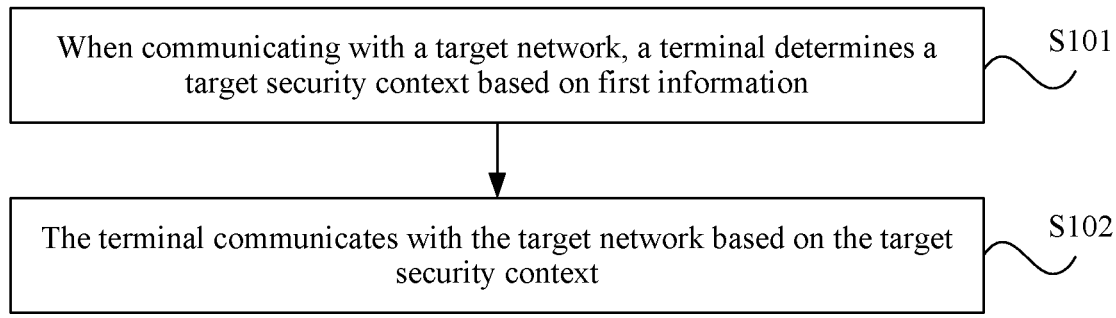
FIG. 3 is a schematic flowchart of a secure communication method according to this application.

FIG. 3 shows a secure communication method according to this application. The method is applied to a terminal. The terminal has a first security context and a second security context, the first security context is used by the terminal to communicate with a first network, the second security context is used by the terminal to communicate with a second network, and the first security context and the second security context include different first information. As shown in FIG. 3, the method includes the following steps.

S101. When communicating with a target network, the terminal determines a target security context based on the first information, where when the target network is the first network, the target security context is the first security context, or when the target network is the second network, the target security context is the second security context.

S102. The terminal communicates with the target network based on the target security context.

According to the secure communication method provided in this application, when the terminal accesses different networks using different access technologies, for example, the first network and the second network, there may be the following cases The different networks belong to a same operator, or the different networks belong to different operators. Regardless of whether the different networks belong to a same operator, there may be the following problem. The terminal device obtains a same key identifier from the different networks. Generally, a function of the key identifier is to identify a key. The network may usually use the key to establish a security context based on a preset algorithm and a parameter such as NAS COUNT. Therefore, if key identifiers obtained by the terminal from different AMFs are the same, keys determined by the terminal based on the key identifiers may also be the same. When the terminal accesses the network again, the terminal does not know which security context is to be selected for communicating with a network that needs to be accessed. Based on this, in this application, the first security context and the second security context on the terminal side include different first information. In this way, when communicating with the target network, the terminal may determine, based on the first information, a security context required when communicating with the target network. For example, the terminal may determine, based on the first information, to use the first security context when communicating with the first network, and use the second security context when communicating with the second network such that the terminal can correctly access a corresponding network.

Access technologies used by the first network and the second network may be any two of a fixed network access technology, a 3GPP access technology, and a non-3GPP access technology.

For example, the access technology of the first network may be the 3GPP access technology, and the access technology of the second network may be the non-3GPP access technology. Alternatively, the access technology of the first network may be the non-3GPP access technology, and the access technology of the second network may be the 3GPP access technology. Alternatively, the access technology of the first network is the 3GPP access technology, and the access technology of the second network is the fixed network access technology. Alternatively, the access technology of the first network is the non-3GPP access technology, and the access technology of the second network is the fixed network access technology or the like.

The first security context is a security context determined when the terminal communicates with the first network, and the second security context is a security context determined when the terminal communicates with the second network.

The security context is a parameter used by the terminal and a network side to protect a message transmitted between the terminal and the network. For example, the security context may include parameters such as a NAS encryption key, a NAS integrity protection key, an encryption algorithm, an integrity protection algorithm, a freshness parameter, and a key identifier.

Optionally, the first information may be at least one of key identifier information and identification information of the terminal.

For example, the key identifier information is information obtained by the terminal to identify a key. For example, the terminal may obtain the key identifier information from the network side. For example, the key identifier information may be a key identifier (evolved key set identifier (eKSI)) in a 4G network.

For example, the identification information of the terminal may be temporary identity information of the UE. The temporary identity information includes at least identity information of a core network element, and may further include network information of an operator. For example, the identification information of the terminal may be a globally unique temporary identity (GUTI). The GUTI may be sent by an AMF in a network together with a registration completion message to the terminal when the terminal requests to register with the network. For another example, the identification information of the terminal may alternatively be 4G network temporary identity information (System Architecture Evolution (SAE)-Temporary Mobile Subscriber Identity (S-TMSI)). For example, as shown in FIG. 2, when the terminal requests to register with the 3GPP network, the GUTI of the terminal may be allocated by an AMF 201 to the terminal.

For example, when key identifier information between the terminal and different networks is different, the first information may be the key identifier information. Table 1 shows that the security context may include not only the key identifier information but also at least one of parameters such as the identification information of the terminal, a NAS key, an algorithm, a freshness parameter used by a NAS, a Radio Resource Control (RRC) key, an algorithm, and a freshness parameter used by an access stratum (AS).

The NAS key is used to protect a NAS message, and the NAS freshness parameter is used to protect the NAS message from a replay attack. The RRC key and the RRC algorithm are used to protect an RRC message of an air interface.

TABLE 1

| Distinguishing between security contexts using different key identifier information | | | | | | |
|---|---|---|---|---|---|---|
| Identifier of a terminal | Security context 1 | First key identifier information | GUTI-2 | NAS key, algorithm used by a NAS stratum, and freshness parameter used by the NAS stratum | RRC key, algorithm used by an AS stratum, and freshness parameter used by the AS stratum | UP key, algorithm, and freshness parameter |
| | Security context 2 | Second key identifier information | GUTI-1 | NAS key, algorithm, and freshness parameter | N3IWF key and freshness parameter | |

The key identifier information in the terminal may usually be obtained from a network device in a network when the terminal registers with the network. Therefore, the terminal may store an association relationship between the key identifier information and the network. In this way, the terminal can determine, based on the key identifier information in the security context, a specific network with which the terminal uses the security context to communicate. As listed in Table 1, a security context 1 includes first key identifier information, and a security context 2 includes second key identifier information. For example, when the terminal accesses a network A next time, if a previous security context between the terminal and the network A is the security context 1, the terminal may select, based on the first key identifier information, the security context 1 to communicate with the network A.

It should be noted that, when key identifier information is different, identification information of the terminal carried in different security contexts may be identical or different. For example, in Table 1, when the key identifier information is different, identification information of the terminal carried in different security contexts is different.

In addition, for example, when identification information between the terminal and different networks is different, the first information may be the identification information of the terminal, as listed in Table 2.

tion information of the terminal may also be used to distinguish between the security contexts.

When the network devices accessed by the terminal belong to different operators, and the network devices belonging to the different operators cannot exchange identification information of the terminal allocated by the network devices to the terminal, the network devices, in different networks, belonging to the different operators may allocate same identification information of the terminal to the terminal. Therefore, the security contexts can be distinguished based on different key identifier information and the identification information of the terminal. When the network devices belonging to the different operators can interact with each other, and the identification information of terminal

TABLE 2

Distinguishing between security contexts using different identification information

| IMSI | Network 1 | Security context 1 | GUTI-2 | First key identifier information | NAS key, algorithm used by a NAS stratum, and freshness parameter used by the NAS stratum (such as NAS COUNT) | RRC key, algorithm used by an AS stratum, and freshness parameter used by the AS stratum | UP key, algorithm, and freshness parameter |
|---|---|---|---|---|---|---|---|
| | Network 2 | Security context 2 | GUTI-1 | First key identifier information | NAS key-1, algorithm-1, and freshness parameter-1 | N3IWF key-1 and freshness parameter used by an AS stratum | |
| | | Security context 3 | | Second key identifier information | NAS key-2, algorithm-2, and freshness parameter-2 | N3IWF key-2 and freshness parameter used by an AS stratum | |

As listed in Table 2, the terminal may use a GUTI-1 and a GUTI-2 to distinguish between a security context 1 and a security context 2. In this case, the security context 1 is a security context between the terminal and a network 1, and the security context 2 is a security context between the terminal and a network 2. In addition, there may alternatively be a plurality of security contexts between the terminal and one network. For example, there is the security context 2 and a security context 3 between the terminal and the network 2. In this case, the terminal may use first key identifier information and second key identifier information to distinguish between the security context 2 and the security context 3.

Moreover, when the identification information of the terminal is used to distinguish between different security contexts, key identifier information in different security contexts may be identical or different. This is not limited in this application. For example, in Table 2, when identification information of the terminal is different, key identifier information in different security contexts is identical or different. This constitutes no limitation on this application.

It should be noted that the identification information of the terminal may be allocated to the terminal by a network device in a network accessed by the terminal. When network devices in the network accessed by the terminal belong to a same operator, identification information of the terminal allocated to the terminal by the network devices accessed by the terminal is usually different. In this case, the identificaallocated by different network devices to the terminal is different, the identification information of terminal may alternatively be used to distinguish between the security contexts. However, in this case, the key identifier information may be used to identify a network to which a security context belongs.

Further, the terminal may further distinguish between different security contexts based on the key identifier information and the identification information of the terminal. For example, when the identification information of the terminal is the same, the key identifier information is used to distinguish between different security contexts. When the key identifier information is the same, the identification information of the terminal can be used to distinguish between different security contexts.

In addition, further, the terminal may further distinguish between security contexts between the terminal and different networks in the following manner.

Optionally, the first security context and the second security context further include different second information, and the second information is used to indicate an access technology of a network corresponding to a security context.

Further, the second information may have a variety of content. For example, the second information may be a first indicator or a second indicator. The first indicator is used to indicate that the terminal accesses a network using a first access technology, and the second indicator is used to indicate that the terminal accesses a network using a second access technology. The first access technology is different from the second access technology. The first access technology and the second access technology are any two of a non-3GPP access technology, a 3GPP access technology, and a fixed network access technology.

For example, the indicator may be bit indication information. For example, the first indicator may be 00, indicating that the terminal uses the 3GPP access technology, the second indicator is 01, indicating that the terminal uses the non-3GPP access technology, and 10 indicates that the terminal uses the fixed network access technology. Alternatively, the first indicator is 01, indicating that the terminal uses the non-3GPP access technology, the second indicator is 00, indicating that the terminal uses the 3GPP access technology, and 10 indicates that the terminal uses the fixed network access technology. This is not limited in this application. Further, content of the first indicator and the second indicator may be negotiated between the terminal and the network.

In another example, the indicator may be character string information. For example, "3GPP" indicates the 3GPP access technology, "non-3GPP" indicates the non-3GPP access technology, and "fix" indicates the fixed network access technology.

In addition, each security context may further include second information that is used to identify an access technology used when the terminal accesses a network previously. To be specific, when generating a security context, the terminal uses, as the second information, an access technology used when the terminal requests to access a network, for example, as listed in Table 3.

nology, the terminal may use a "fix" identifier in a previous security context between the terminal and the network. Alternatively, the terminal uses the bit identifier 01 to indicate 3GPP, 10 to indicate non-3GPP, and 11 to indicate the fixed network access technology. This is not limited in this application.

It should be noted that when the second information is used in this application to distinguish between the first security context and the second security context, the first information in the first security context and the first information in the second security context may be the same.

Moreover, in Table 3, when the identification information of the terminal is the GUTI-1, a difference between the security context 2 and the security context 3 lies in that key identifier information is different, freshness parameters are different, and others may be the same. This is because when the terminal accesses a same network device using different access technologies, the network device may send a same key to the terminal, for example, a NAS key-1 and an N3IWF key-1, but NAS COUNT is different. NAS COUNT is a type of freshness parameter.

Optionally, it may be learned from Table 3 that when the terminal stores an UP key, and the terminal accesses a network using the 3GPP access technology, a security context between the terminal and the network includes the UP key. When the terminal accesses a network using the non-3GPP access technology, a security context between the terminal and the network may not include the UP key. Therefore, in this application, the security context used by the 3GPP access technology and the security context used by

TABLE 3

Distinguishing between security contexts using access technologies

| IMSI | Network 1 | GUTI-2 | Security context 1 | First key identifier information | NAS key, algorithm used by a NAS stratum, and freshness parameter used by the NAS stratum | RRC key, algorithm, and freshness parameter used by an AS stratum | UP key, algorithm, and freshness parameter | "3GPP" |
|---|---|---|---|---|---|---|---|---|
| | Network 2 | GUTI-1 | Security context 2 | First key identifier information | NAS key-1, algorithm-1 used by a NAS stratum, and freshness parameter-1 used by the NAS stratum | N3IWF key-1 and freshness parameter used by an AS stratum | UP security key | "3GPP" |
| | | | Security context 3 | Second key identifier information | NAS key-1, algorithm-1 used by a NAS stratum, and freshness parameter-2 used by the NAS stratum | N3IWF key-1 and freshness parameter used by an AS stratum | | "non-3GPP" |

As listed in Table 3, when accessing a network 1 using the 3GPP access technology, the terminal may use a security context that includes a character string "3GPP" identifier and that is stored jointly with the network 1, namely, a security context 1. When accessing a network 2 using the non-3GP access technology, the terminal uses a security context that includes a character string "non-3GPP" identifier and that is stored jointly with the network 2, namely, a security context 3, that is, the security context includes the character string "non-3GPP" identifier. In addition, when accessing a network using the fixed network access techthe non-3GPP access technology may further be distinguished using the UP key included in the security context. For example, if the first security context does not include a UP key, the first security context may be the security context stored when the terminal accesses the network using the non-3GPP access technology. If the second security context includes a UP key, the second security context may be the security context stored when the terminal accesses the network using the 3GPP access technology. Alternatively, the first security context includes a UP key, and the second security context does not include a UP key.

Further, when determining that the first security context does not include the UP key, the terminal may determine that the first security context is used by the terminal to access the network using the non-3GPP access technology such that the first security context can be used when the terminal accesses the network using the non-3GPP access technology again. When determining that the second security context includes the UP key, the terminal may determine that the second security context can be used during 3GPP access such that the second security context can be used when the terminal accesses the network using the 3GPP access technology again.

The UP key is a key that protects UP security when the terminal communicates with the network device, and includes at least one of an UP encryption key and an UP integrity protection key.

That the security context does not include a UP key means that no UP key needs to be generated in a process of accessing the target network. However, the following case is not excluded The terminal once accessed the target network using the 3GPP access technology, and the stored security context has the UP key.

It should be noted that the foregoing identification parameters such as the UP key, the identification information of the terminal, the key identifier information, and the access technology may be combined to distinguish between the security contexts. A specific combination manner is not limited in this application, provided that the security contexts between the terminal and different networks can be finally distinguished using the identification parameter.

Optionally, the key identifier information in this application may further include identification information of an operator. Further, after the terminal receives information about an operator using a broadcast message or learns, using another method, information indicating a specific operator to which the target network belongs, such as information indicating a specific operator to which a to-be-used N3IWF belongs, the terminal may determine, based on the information about the operator, key identifier information corresponding to the operator, further determine a used key based on the key identifier information corresponding to the operator, and then perform integrity protection on a to-be-sent message using the determined key.

In addition, after the terminal completes data transmission by accessing the network using two different access technologies simultaneously, the terminal usually returns to an idle mode. However, when the terminal returns to a connected mode from the idle mode, the terminal first determines, based on information in a GUTI and information about a network in which the terminal is located, a GUTI that satisfies a condition of the network, and after determining the GUTI, determines a key based on the GUTI, as listed in Table 2 or Table 3. Therefore, the terminal may use the key to perform integrity protection on a to-be-sent message. In another method, the terminal first determines information about a security context based on key identifier information that carries information about an operator, and then determines a GUTI that belongs to the operator. In this case, optionally, the GUTI may be a part of the security context.

After the terminal determines a security context that belongs to a to-be-accessed network, if the terminal has security contexts corresponding to different access technologies, the terminal may further determine a type of an access technology for access, and then determine a key. Further, optionally, the terminal may determine, based on other information, which security context is to be finally used, for example, whether there is an UP key, and whether there is an explicit identifier indicating a security context corresponding to a specific access technology. After the key is determined, integrity protection may be performed on a to-be-sent message.

Figure 4:
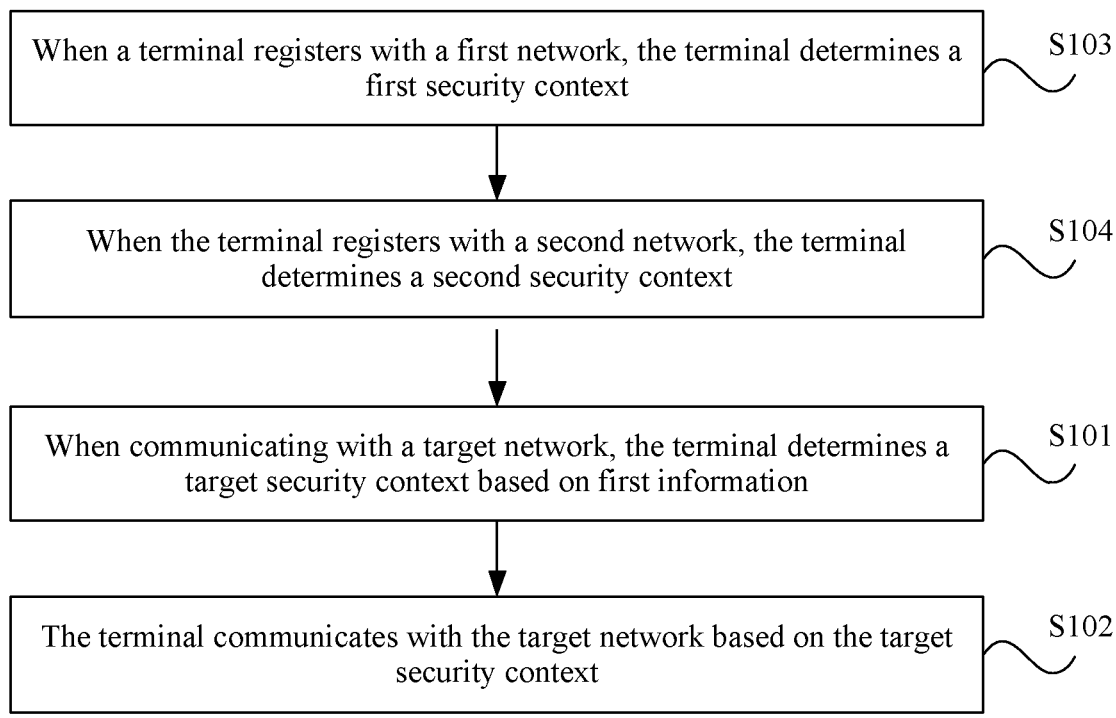
FIG. 4 is a schematic flowchart of a secure communication method according to this application.

Generally, the terminal needs to register with a network before establishing a security context between the terminal and the network in order to store the security context between the terminal and the network into the terminal. Therefore, in another embodiment provided in this application, as shown in FIG. 4, before step S101, the method provided in this application further includes the following steps.

S103. When the terminal registers with the first network, the terminal determines the first security context.

The key identifier information may usually be used as content in the security context, and the key identifier information in the terminal may usually be allocated by a network device in a network to the terminal when the terminal registers with the network. Therefore, step S103 in this application may be implemented in the following manner.

S1031. The terminal receives first key identifier information from a first network device.

Optionally, the terminal may receive, from the first network device, a message used to indicate that authentication on the terminal succeeds, where the message used to indicate that authentication on the terminal succeeds includes the first key identifier information. When the first network device sends the first key identifier information to the terminal using the message used to indicate that authentication on the terminal succeeds, the first network device may send the key identifier information after determining that authentication on the terminal succeeds. This avoids a signaling waste caused by sending the key identifier information while authentication on the terminal fails.

Optionally, the terminal may receive a NAS SMC message sent by the first network device, where the NAS SMC message includes the first key identifier information.

When the NAS SMC message includes the first key identifier information, the NAS SMC message may further include a message used to indicate that authentication on the terminal succeeds. In other words, the message used to indicate that authentication on the terminal succeeds and the first key identifier information may be added to the NAS SMC message, thereby reducing signaling overheads.

Optionally, the terminal may receive a NAS SMC message sent by the first network device, where the NAS SMC message includes a message used to indicate that authentication on the terminal succeeds, and the message used to indicate that authentication on the terminal succeeds includes the first key identifier information. When the first network device sends the first key identifier information to the terminal using the NAS SMC message, and the first key identifier information is located in the message used to indicate that authentication on the terminal succeeds, signaling overheads can be reduced. It can be understood that a manner in which the first network device sends the first key identifier information using the NAS SMC message is applicable to 5G-authentication and key agreement (AKA) authentication, Extensible Authentication Protocol (EAP)-AKA' authentication, and other authentication methods used in a 3GPP system in the future.

Authentication manners may include evolved packet system (EPS)-AKA authentication, 5G-AKA authentication, EAP-AKA' authentication, and the like. The EAP-AKA' authentication is used as an example. For example, the message used to indicate that authentication on the terminal succeeds may be referred to as an EAP-Success message. This name is merely an example, and imposes no limitation.

Further, when the terminal registers with the first network device, the first network device may send the first key identifier information to the terminal using a message used to transfer an authentication vector, the message used to indicate that authentication on the terminal succeeds, or an authentication vector.

There may be a plurality of messages used to indicate that authentication on the terminal succeeds. For example, in an implicit notification manner, that is, after authentication on the terminal succeeds, the SEAF sends some parameters to the AMF, for example, sends a subscriber permanent identifier (SUFI) or sends a key Kamf. For another example, in an explicit notification manner, that is, the SEAF directly sends an authentication success message to the AMF. For example, in the 5G-AKA authentication method, the SEAF sends a message to the AMF. The message may be an EAP-Success message in the EAP-AKA' authentication method, or certainly may be the message used to indicate that authentication on the terminal succeeds in the 5G-AKA authentication.

S1032. The terminal generates the first security context that includes the first key identifier information, where the first key identifier information is used to identify the first security context.

S104. When the terminal registers with the second network, the terminal determines the second security context.

Further, step S104 in this application may be implemented in the following manner.

S1041. The terminal receives second key identifier information from a second network device.

Further, when the terminal registers with the second network device, the second network device may send the second key identifier information to the terminal using an authentication vector or a message used to indicate that authentication on the terminal succeeds.

The message used to indicate that authentication on the terminal succeeds is the same as that described above. Details are not described herein again.

S1042. The terminal generates the second security context that includes the second key identifier information, where the second key identifier information is used to identify the second security context.

Further, a process of generating the first security context by the terminal may be as follows.

When the terminal receives the first key identifier information from the first network device in the accessed network, the terminal may generate the first security context based on parameters in Table 1, Table 2, and Table 3. Further, for a process of generating the second security context by the terminal, refer to the process of generating the first security context by the terminal. Details are not described in this application again.

It can be understood that when the terminal generates the first security context based on the first key identifier information, the first security context may further include other parameters. For specific parameters, refer to some parameters listed in Table 1, Table 2, and Table 3. For example, the first security context may further include the identification information of the terminal and the access technology used by the terminal. This is not limited in this application.

For example, as shown in FIG. 2, when the terminal accesses the first network using the 3GPP access technology, the first network device may be the AMF 201 shown in FIG. 2. When the terminal accesses the second network using the non-3GPP access technology, the second network device may be the AMF 202 shown in FIG. 2.

Further, there is usually an authentication process between the terminal and a network when the terminal registers with the network. Further, the terminal may obtain key identifier information from a network device in the network when or after authentication on the terminal is completed on a network side.

It can be understood that when the first network device and the second network device belong to a same operator, the first network device can interact with the second network device. Therefore, the first key identifier information sent by the first network device to the terminal is usually different from the second key identifier information sent by the second network device to the terminal. When the first network device and the second network device belong to different operators, if the first network device and the second network device cannot exchange key identifier information allocated by the first network device and the second network device to the terminal, the first key identifier information and the second key identifier information may be identical or different.

In addition to receiving the first key identifier information from the first network device and receiving the second key identifier information from the second network device, the terminal may receive first identification information from the first network device and receive second identification information from the second network device. The first key identifier information is used to identify the first security context, and the second key identifier information is used to identify the second security context. The first identification information is used to identify the terminal in the first network, and the second identification information is used to identify the terminal in the second network. When key identifier information is used to distinguish between a network using the first security context and a network using the second security context, the first key identifier information is different from the second key identifier information. When identification information is used to distinguish between the network using the first security context and the network using the second security context, the first identification information is different from the second identification information.

Optionally, in another possible implementation of this application, before step S101, the method further includes the following steps.

S105. The terminal determines whether a first identifier of the network accessed by the terminal is the same as a first identifier of the target network that the terminal currently requests to register with.

Optionally, an access technology of the network accessed by the terminal is different from an access technology of the target network that the terminal currently requests to register with.

Further, the first identifier is used to determine whether the network accessed by the terminal and the target network that the terminal currently requests to register with belong to a same operator.

Further, the first identifier may be a PLMN ID, a cell ID, location area information, or the like. The PLMN ID may be an Internet Protocol (IP) address, may be email-like address information, or may be mobile country codes (MCC)+ mobile network codes (MNC) information. This is not limited in this application.

Further, an example in which the terminal determines, based on the first identifier, whether the accessed network and the target network that the terminal currently requests to register with belong to a same operator is as follows. The terminal obtains a PLMN ID-1 of the accessed network and a PLMN ID-2 of the target network that the terminal currently requests to register with. The terminal determines that the PLMN ID-1 of the accessed network is the same as the PLMN ID-2 of the target network that the terminal currently requests to register with, and then the terminal determines that the accessed network and the target network that the terminal currently requests to register with belong to a same operator. In this way, the terminal can send a request from the target network that the terminal currently requests to register with, to a network device 1 corresponding to the accessed network, and the network device 1 sends the request from the target network that the terminal currently requests to register with, to a network device 2 in the target network. In this case, the target network is the accessed network.

Figure 5:
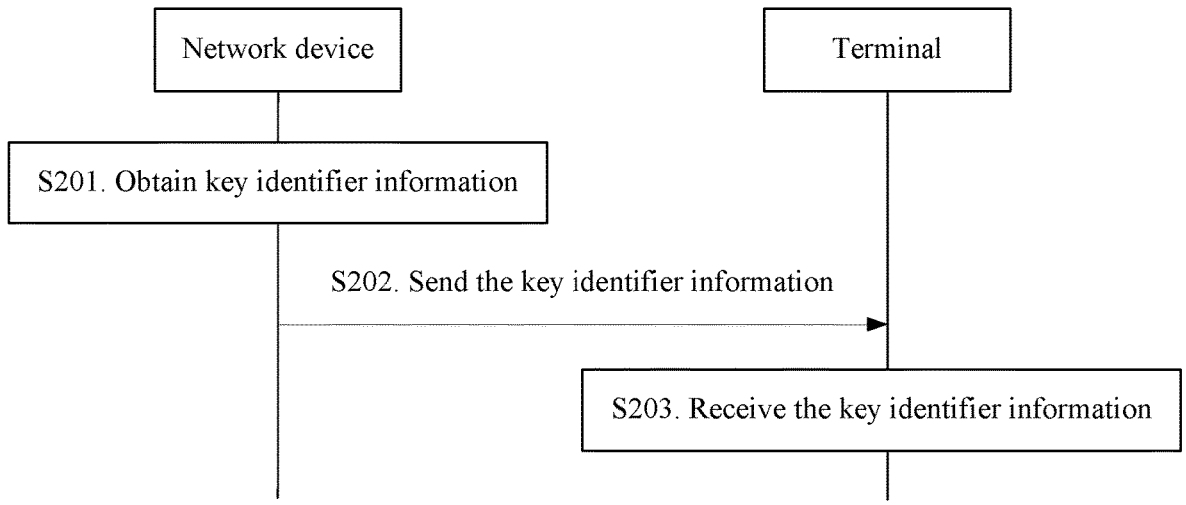
FIG. 5 is a schematic flowchart of a secure communication method according to this application.

FIG. 5 is a schematic flowchart of a secure communication method according to an embodiment of this application. As shown in FIG. 5, the method includes the following steps.

S201. A first network device obtains key identifier information.

Further, the first network device may be the AMF, the AUSF, or the SEAF shown in FIG. 1 or FIG. 2.

In this application, the first network device may generate the key identifier information when authentication on a terminal is completed on a network side, or may generate the key identifier information in a process of performing authentication on the terminal on a network side.

S202. The first network device sends the key identifier information to the terminal after completing authentication on the terminal on the network side.

Further, the first network device may determine, in the following manner, that authentication on the terminal is completed on the network side. For example, when the first network device is the AUSF, the first network device completes authentication on the terminal. Based on this, the first network device can determine that authentication on the terminal is completed on the network side. When the first network device is the AMF, and the first network device receives, from the AUSF or the SEAF, a message used to indicate that authentication on the terminal succeeds, the first network device determines that authentication on the terminal is completed on the network side. When the first network device is the SEAF, and the first network device receives, from the AUSF, a message used to indicate that authentication on the terminal succeeds, the first network device determines that authentication on the terminal is completed on the network side.

For the message used to indicate that authentication on the terminal succeeds, refer to the foregoing embodiment. Details are not described in this application again.

Optionally, step S202 in this application may be implemented in the following manner.

S2021. The first network device may send the key identifier information to the terminal using the message used to indicate that authentication on the terminal succeeds.

In this application, the message used to indicate that authentication on the terminal succeeds is used to send the key identifier information to the terminal, and the key identifier information may be sent after it is determined that authentication on the terminal succeeds. This avoids a signaling waste caused by sending the key identifier information while authentication on the terminal fails.

Certainly, the first network device may send the key identifier information to the terminal using a signaling message newly defined in a process of indicating an authentication success to the terminal.

The newly defined signaling message may be considered as a message used in an authentication process. The message is a message in 5G-AKA or EAP-AKA' authentication process. Alternatively, the message can be understood as a message before the first network device sends a NAS SMC message after authentication succeeds, and the message is not in a 5G-AKA or EAP-AKA' message. Alternatively, the message may be a bearer message that bears the message used to indicate that authentication on the terminal succeeds. For example, the bearer message is a NAS message transferred over an N2 interface.

Further, the key identifier information may be carried in the message indicating that authentication succeeds, and the message is transferred to the terminal, or may be placed outside the message indicating that authentication succeeds, and transferred to the terminal together with the newly defined signaling. For example, the message used to indicate that authentication on the terminal succeeds may be sent using a NAS SMC message. To be specific, the key identifier information is carried in the message used to indicate that authentication on the terminal succeeds, and the message used to indicate that authentication on the terminal succeeds is carried in the NAS SMC message, or the key identifier information may be placed outside the message indicating that authentication succeeds, and placed in the NAS SMC message.

It should be noted that, the key identifier information sent by the AMF using the NAS SMC message is applicable to 5G-AKA authentication, EAP-AKA' authentication, or other authentication processes used in a 3GPP system in the future.

Optionally, step S202 in this application may further be implemented in the following manner.

S2022. The first network device sends the key identifier information to the terminal using the NAS SMC message.

It can be understood that, when the first network device sends the key identifier information to the terminal using the NAS SMC message, the NAS SMC message may further include the message used to indicate that authentication on the terminal succeeds. In this case, the message used to indicate that authentication on the terminal succeeds is transmitted in the NAS SMC message, reducing signaling overheads. This is because when the NAS SMC message and the message used to indicate that authentication on the terminal succeeds are sent to the terminal as two messages, the terminal needs to respond to both the messages when receiving the NAS SMC message and the message used to indicate that authentication on the terminal succeeds. Consequently, signaling overheads are inevitably increased, and an interaction process between the AMF and the terminal is added.

Certainly, in the process of performing authentication on the terminal on the network side, when generating the key identifier information, the first network device in this application may further send the key identifier information to the terminal in a process of sending an authentication vector to the terminal. For example, the key identifier information is sent to the terminal using an EAP-request (REQ)/AKA'-Challenge message.

It should be noted that the description using EAP-AKA' as an example in this application may also be applicable to 5G-AKA. If 5G-AKA does not include a procedure in EAP-AKA', a similar or related message may be used instead in 5G-AKA. Certainly, a corresponding procedure may alternatively be added in 5G-AKA to complete a related operation.

S203. The terminal receives the key identifier information sent by the first network device.

Further, the terminal may receive, in the NAS SMC message, the key identifier information sent by the first network device, or may receive the key identifier information in the message used to indicate that authentication on the terminal succeeds. Which message is used by the terminal to receive the key identifier information may depend on which message is used by the first network device to send the key identifier information.

When the first network device is the AMF, the AUSF, or the SEAF, methods for determining the key identifier information by the first network device are different. Therefore, the following separately describes the methods.

Optionally, in a possible implementation, when the first network device is the AMF or the SEAF, step S201 in this application may be implemented in the following manner.

S2011. The first network device receives the message used to indicate that authentication on the terminal succeeds, and generates the key identifier information. In this application, when receiving the message used to indicate that authentication on the terminal succeeds, the first network device can determine that authentication on the terminal succeeds on the network side. The first network device generates the key identifier information only in this case. This can avoid wasting the generated key identifier information when authentication on the terminal fails.

Further, when the first network device is the AMF, and the AMF receives, from the SEAF or the AUSF, the message used to indicate that authentication on the terminal succeeds, the AMF obtains the key identifier information. In this case, optionally, when the message used to indicate that authentication on the terminal succeeds includes the key identifier information, the AMF can directly obtain the key identifier information from the message used to indicate that authentication on the terminal succeeds. Optionally, when the message used to indicate that authentication on the terminal succeeds does not include the key identifier information, the AMF generates the key identifier information by itself.

When the first network device is the SEAF, after the SEAF receives, from the AUSF, the message used to indicate that authentication on the terminal succeeds or after the SEAF itself verifies that the UE is real, the SEAF obtains the key identifier information. In this case, optionally, when the message used to indicate that authentication on the terminal succeeds includes the key identifier information, the SEAF can directly obtain the key identifier information from the message used to indicate that authentication on the terminal succeeds. Certainly, there is alternatively a case in which all the key identifier information is generated by the SEAF or the AMF, that is, the message indicating that authentication on the terminal succeeds does not include the key identifier information.

The key identifier information may be generated by at least one network device. If at least two network devices generate key identifiers, the key identifiers need to be transferred to next-level network devices (for example, the AUSF generates and transfers the key identifier information to the SEAF or the AMF, or the SEAF generates and transfers the key identifier information to the AMF). Therefore, each next-level network device may generate the key identifier information, or may obtain the key identifier information from a previous-level network device, to determine the key identifier information. The following separately provides descriptions.

Optionally, step S2011 in this application may be implemented in the following manner. After receiving the message used to indicate that authentication on the terminal succeeds, or after determining that the UE is real, the first network device determines first key identifier information sent by a second network device as the key identifier information. For example, when the first network device is the AMF, the second network device may be the SEAF or the AUSF, or when the first network device is the SEAF, the second network device may be the AUSF. Further, for a manner in which the second network device sends the key identifier information to the first network device, refer to the foregoing description. This is not limited in this application.

Optionally, step S2011 in this application may be implemented in the following manner. After determining that the first network device receives the message used to indicate that authentication on the terminal succeeds, or after determining that the UE is real, the first network device generates the key identifier information. In this case, when the message used to indicate that authentication on the terminal succeeds does not carry the first key identifier information sent by the second network device, the first network device may generate the key identifier information by itself. When the message used to indicate that authentication on the terminal succeeds carries the first key identifier information sent by the second network device, the first network device may generate the key identifier information based on the first key identifier information, or may generate the key identifier information not based on the first key identifier information. This is not limited in this application.

Figure 6:
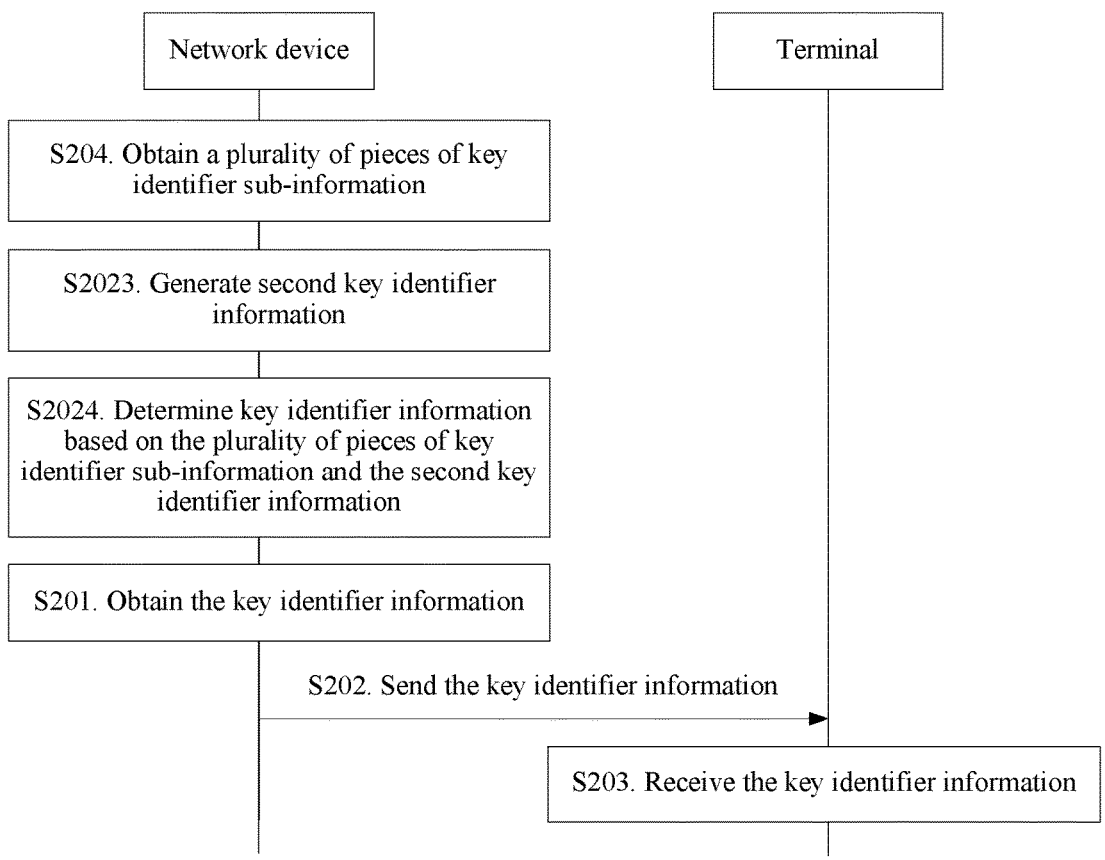
FIG. 6 is a schematic flowchart of a secure communication method according to this application.

Optionally, in still another embodiment of this application, based on FIG. 5, as shown in FIG. 6, before step 201, the method provided in this application further includes the following step.

S204. The first network device obtains a plurality of pieces of key identifier sub-information, where all the plurality of pieces of key identifier sub-information come from another network device, or some of the plurality of pieces of key identifier sub-information are generated by the first network device, and some of the plurality of pieces of key identifier sub-information come from another network device.

The other network device herein may be the SEAF or the AUSF. Further, when the first network device is the AMF, the other network device may be at least one of the SEAF or the AUSF. When the first network device is the SEAF, the other network device may be the AUSF.

Optionally, the key identifier information in this application may be a key identifier.

The following uses an example for description in which the SEAF, the AUSF, and the AMF all generate the key identifier information. The AUSF generates key identifier information-a, the SEAF generates key identifier information-b, and the AMF generates key identifier information-c. Then, the AMF combines the key identifier information-a, the key identifier information-b, and the key identifier information-c to determine the key identifier information. In this case, the key identifier information is the key identifier information-c, the key identifier information-b, and the key identifier information-a. For another example, when it is specified in a network that the key identifier information has 9 bits, the AUSF may fill the three most significant bits the ninth bit, the eighth bit, and the seventh bit, and then transfer 001000000 to the SEAF after the filling. The SEAF further fills the sixth bit, the fifth bit, and the fourth bit, and finally the key identifier information sent by the SEAF to the AMF may be 001010000. Finally, the AMF fills the last 3 bits the third bit, the second bit, and the first bit, and finally obtains the key identifier information 001010001.

Herein, for a method for sending the plurality of pieces of key identifier sub-information to the first network device by the AUSF or the SEAF, refer to the foregoing steps, and this is not limited in this application. A plurality of pieces of key identifier sub-information generated by the AUSF may be the same as or different from those generated by the SEAF, and this is not limited in this application.

Based on step S204, step S202 in this application may be implemented in the following manner.

S2023. The first network device receives the message used to indicate that authentication on the terminal succeeds, and generates second key identifier information.

Further, in this application, the first network device may generate the second key identifier information based on the plurality of pieces of key identifier sub-information, or may generate the second key identifier information based on other parameters than the plurality of pieces of key identifier sub-information.

S2024. The first network device determines the key identifier information based on the plurality of pieces of key identifier sub-information and the second key identifier information.

For example, after the AUSF receives a message (for example, an EAP-RSP/AKA'-Challenge message) that is used to instruct to perform authentication on the terminal, the AUSF generates key identifier information 1, and then the AUSF may send the key identifier information 1 to the SEAF using a message that is used to indicate that authentication on the terminal is completed (the following uses an EAP-Success message as an example, and a specific name of the message that is used to indicate that authentication on the terminal is completed is not limited in this application). After receiving the EAP-Success message that carries the key identifier information 1, the SEAF may determine that authentication on the terminal is completed on the network side, and then generates key identifier information 2. Subsequently, the SEAF sends the key identifier information 1 and the key identifier information 2 to the AMF using the EAP-Success message. After receiving the EAP-Success message that carries the key identifier information 1 and the key identifier information 2, the AMF generates key identifier information 3. Finally, the AMF determines the key identifier information based on the key identifier information 1, the key identifier information 2, and the key identifier information 3.

This application imposes no limitation on a manner in which the AMF determines the key identifier information based on the key identifier information 1, the key identifier information 2, and the key identifier information 3. The AMF may determine the key identifier information based on locations of the key identifier information 1, the key identifier information 2, and the key identifier information 3. However, this application imposes no limitation on a location of each piece of key identifier information. For example, the key identifier information is the key identifier information 1+the key identifier information 2+the key identifier information 3, or the key identifier information is the key identifier information 2+the key identifier information 3+the key identifier information 1. In this way, advantageously, when the AUSF or the SEAF stores keys of more than one terminal, the AUSF or the SEAF may identify, using the key identifier information, a key used by the terminal. Therefore, each network element generates a part of the key identifier information such that the key identifier information can be more flexible, especially when a network element other than the AMF also has a plurality of security contexts of the terminal.

Optionally, in a possible implementation, when the first network device is the AUSF, step S201 in this application may further be implemented in the following manner.

S2012. The first network device determines that an authentication request for the terminal is received, and the first network device determines the key identifier information.

Further, if the first network device determines that the authentication request for the terminal is received from the SEAF, the first network device generates the key identifier information to determine the key identifier information.

Figure 7A:
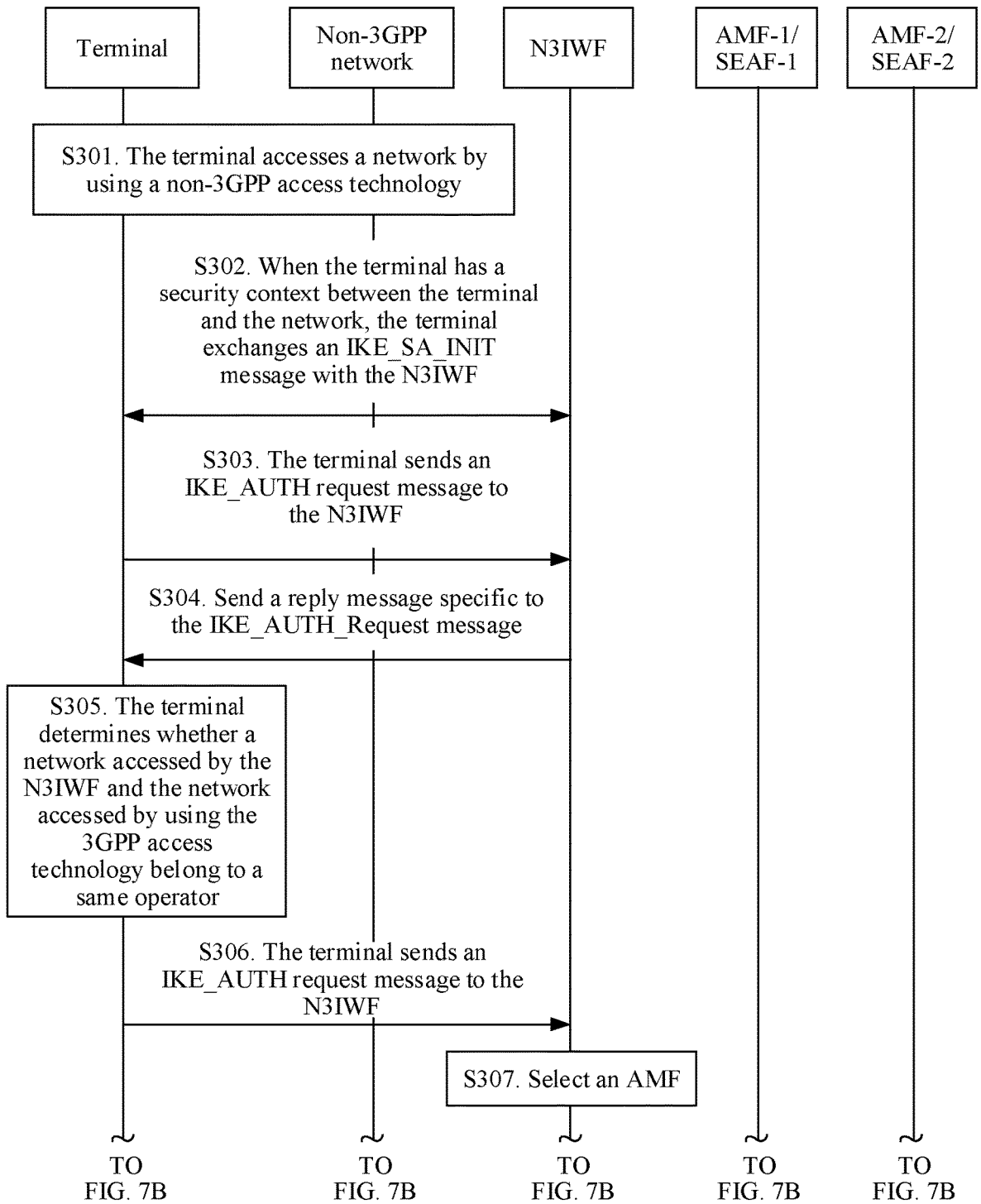
FIG. 7A, FIG. 7B, and FIG. 7C are a schematic flowchart of a secure communication method according to this application.
Figure 7B:
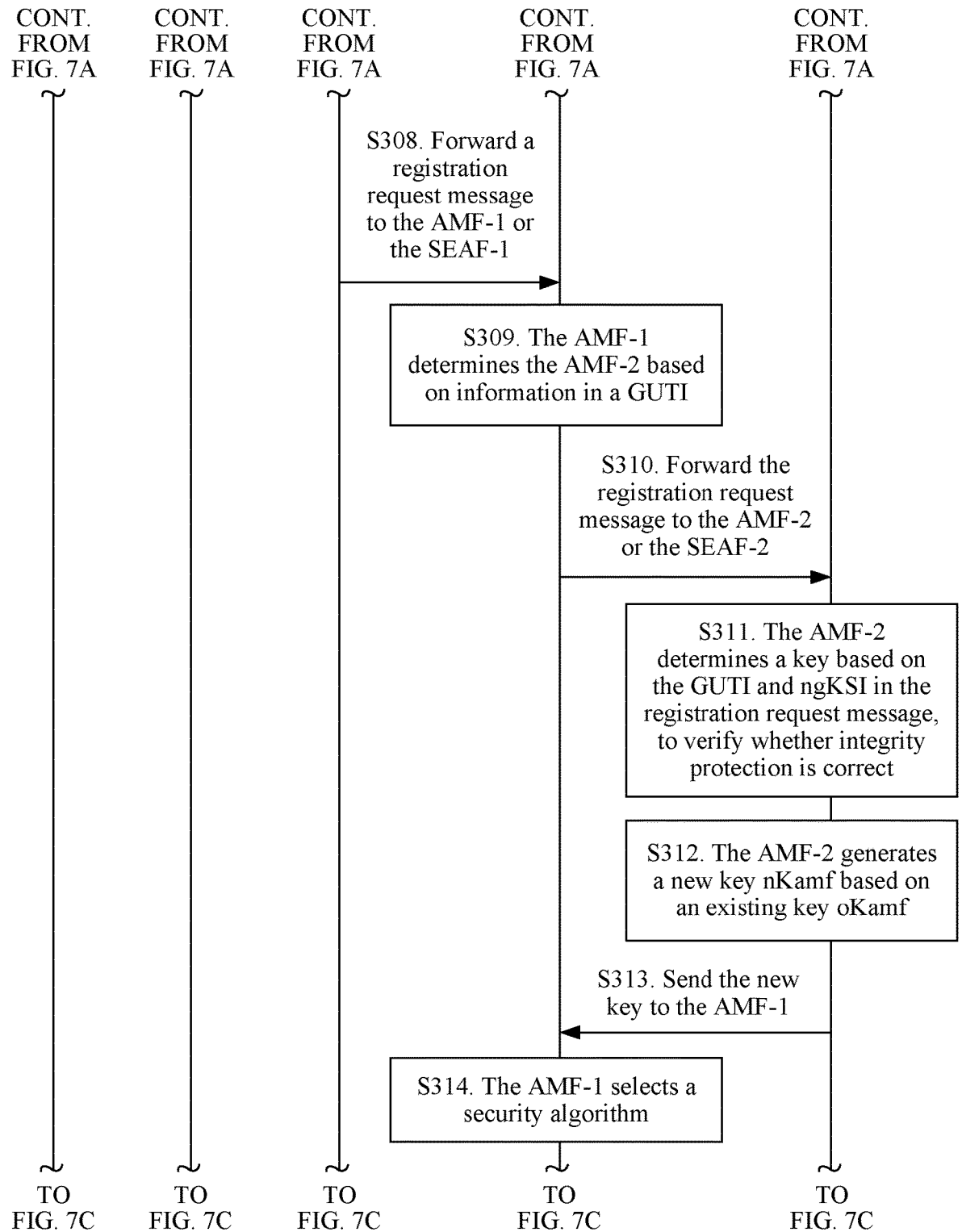
Figure 7C:
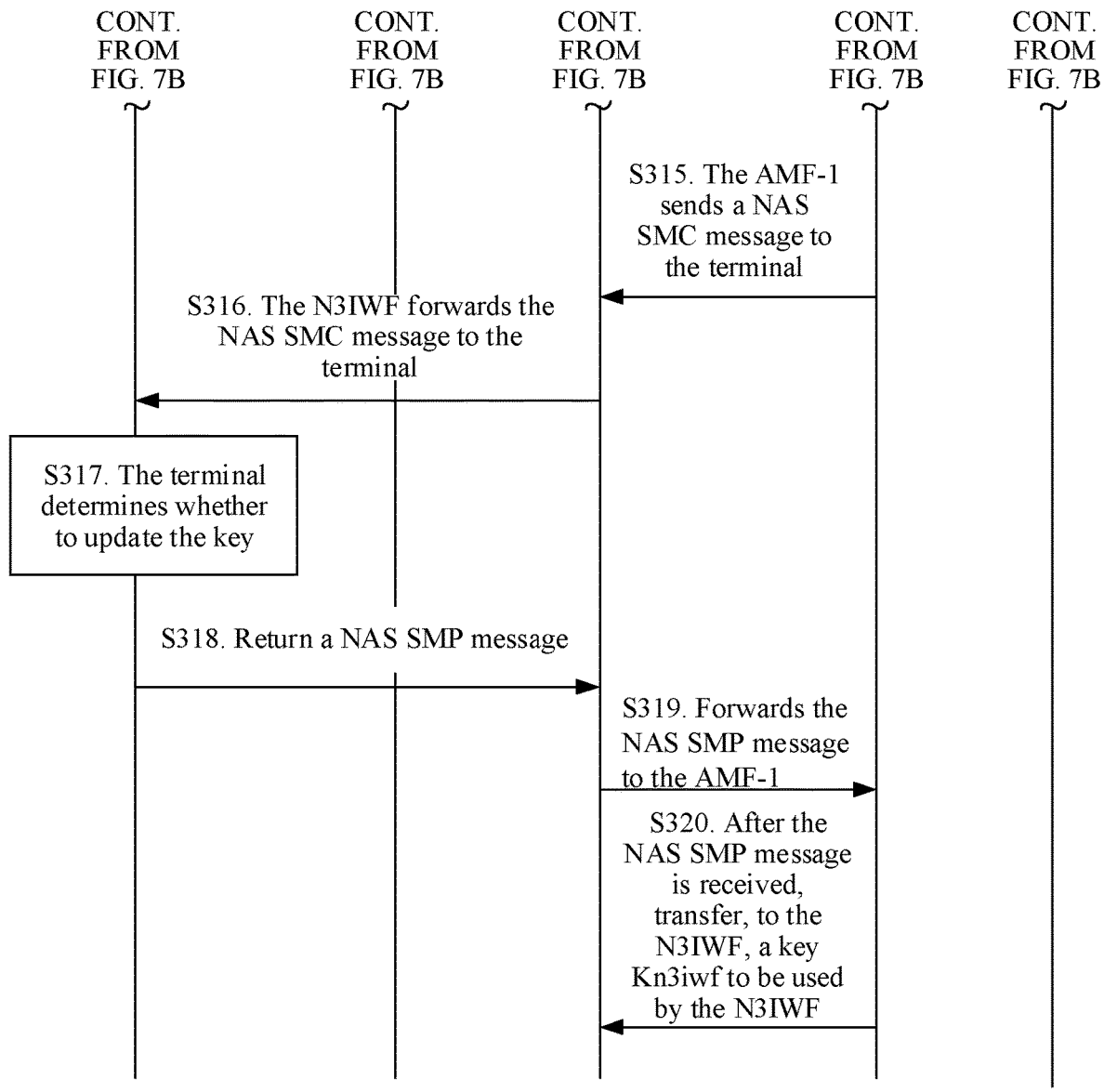

With reference to FIG. 7A, FIG. 7B, and FIG. 7C, the following details a secure communication method provided in this application using an example in which a terminal first gains access from a 3GPP side, but starts to gain access from a non-3GPP side because a condition is triggered.

S301. The terminal accesses a network using a non-3GPP access technology.

Further, for implementation of step S301, refer to other approaches. This is not limited in this application.

S302. When the terminal has a security context between the terminal and the network, the terminal exchanges an IKE_SA_INIT message with an N3IWF.

Optionally, the IKE_SA_INIT message carries a key material. After the terminal completes interaction with the N3IWF, a same key may be generated between the terminal and the N3IWF in order to protect all subsequent messages.

S303. The terminal sends an Internet key exchange protocol authentication request (IKE_AUTH_Request) message to the N3IWF.

The IKE_AUTH_Request message carries identification information of the terminal, and the IKE_AUTH_Request message may not carry an authentication parameter.

S304. The N3IWF sends a reply message specific to the IKE_AUTH_Request message to the terminal, where the reply message specific to the IKE_AUTH_Request message is used to instruct the terminal to start a 5G authentication procedure.

Optionally, the reply message specific to the IKE_AUTH_Request message carries an EAP-5G-Request message/5G-Start message.

S305. The terminal determines whether a network accessed by the N3IWF and a network accessed using a 3GPP access technology belong to a same operator.

Further, the terminal searches for a related N3IWF using a PLMN ID of the network accessed using the 3GPP access technology. For another example, the terminal obtains a feedback, where content of the feedback is information related to the N3IWF. The terminal may determine, based on the information, whether a PLMN ID of the network in which the N3IWF is located is the same as a PLMN ID of the network accessed using the 3GPP access technology.

For specific content of the PLMN ID herein, refer to the foregoing embodiment. This is not limited in this application.

S306. The terminal sends an IKE_AUTH request message to the N3IWF, where the IKE_AUTH request message is used by the terminal to register with an AMF.

Optionally, the IKE_AUTH request message includes an EAP-5G-ReS/5G-NAS message.

The EAP-5G-ReS/5G-NAS message includes a NAS-protocol data unit (PDU), the NAS PDU includes a registration request message, and the registration request message is used by the terminal to register with the AMF.

It can be understood that when the terminal has registered with the AMF using the 3GPP access technology, the registration request herein may be used by the terminal to register with the AMF using the non-3GPP access technology.

Optionally, the registration request message carries temporary identity information of the terminal, for example, a GUTI or key identifier information ngKSI. Integrity protection is performed on the registration request message using a NAS integrity key identified by ngKSI.

S307. The N3IWF first selects an AMF based on information in the GUTI.

Further, when the N3IWF finds, based on the GUTI, an AMF-2/SEAF-2 identified by the GUTI, the N3IWF sends the registration request message to the AMF-2/SEAF-2. When the N3IWF cannot find the AMF-2/SEAF-2 based on the GUTI, the N3IWF forwards the registration request message to an AMF-1/SEAF-1. That the N3IWF cannot find the AMF-2/SEAF-2 based on the GUTI is used as an example in this embodiment of this application.

S308. The N3IWF forwards the registration request message to the AMF-1.

S309. The AMF-1 determines the AMF-2 based on the information in the GUTI.

S310. The AMF-1 forwards the registration request message to the AMF-2.

S311. The AMF-2 determines a key based on the GUTI and ngKSI in the registration request message to verify whether integrity protection is correct, and when integrity protection is correct, performs the following step S312.

S312. The AMF-2 generates a new key nKamf based on an existing key oKamf in the AMF-2.

S313. The AMF-2 sends the new key nKamf to the AMF-1.

Optionally, the AMF-2 may further send first indication information to the AMF-1, where the first indication information is used to indicate that the terminal and the AMF-2 are connected.

Further, the first indication information may be a key identifier currently used by the AMF-2, or may be bit indication information.

A possible implementation in which the AMF-2 generates the new key nKamf based on the existing key oKamf is: nKamf=KDF (oKamf, another parameter), and a quantity of the other parameter may be one or more. For example, the other parameter is NAS COUNT, NAS COUNT and ngKSI, or ngKSI, or Kamf is used to maintain one COUNT value. This COUNT value is transferred to the AMF-1, and is transferred to the terminal by the AMF-1 using a NAS SMC message.

Another implementation is: nKamf=key derivation function (KDF) (Kseaf, another parameter), where Kseaf represents a key in the SEAF.

S314. The AMF-1 selects a security algorithm.

The AMF-1 generates a new NAS key and a new key identifier using nKamf.

Further, on one hand, the new key identifier generated by the AMF may be different from a received key identifier such that the terminal distinguishes between different security contexts based on the key identifiers.

On the other hand, the AMF generates a key identifier that is the same as the received key identifier. In this case, the terminal may use the identification information of the terminal to distinguish between different security contexts.

S315. The AMF-1 sends the NAS SMC message to the terminal.

Optionally, the NAS SMC message carries a selected security capability and key identifier information. For example, the key identifier information may be a key identifier.

Optionally, when the key identifier carried in the NAS SMC message is different from a key identifier stored in the terminal, the AMF-1 may further send second indication information to the terminal, where the second indication information is used to notify the terminal whether an original key needs to be reserved. Optionally, when the key identifier is different from the previous one, the terminal may reserve the previous key identifier by default.

S316. The N3IWF forwards the NAS SMC message to the terminal.

S317. After receiving the NAS SMC message, the terminal determines whether to update the key.

Further, the terminal may determine, in the following manner, whether to update the key.

Manner 1: The terminal determines that the terminal is accessing on the 3GPP side. If a NAS SMC message is received from the non-3GPP side, the terminal determines that a new key needs to be generated on the non-3GPP side.

Manner 2: If the terminal determines that a new key identifier ngKSI sent by the AMF-1 is received, the terminal generates a new key based on the new key identifier ngKSI.

Manner 3: The terminal determines, based on the second indication information, or a COUNT value carried in the NAS SMC message, whether to update the key.

Further, if the second indication information instructs to update the key, the terminal updates the key.

S318. The terminal returns a NAS SMP message to the AMF-1.

Optionally, integrity protection is performed on the NAS SMP message using a new key.

S319. The N3IWF forwards the NAS SMP message to the AMF-1.

S320. After receiving the NAS SMP message, the AMF-1 transfers, to the N3IWF, a key Kn3iwf to be used by the N3IWF. In addition, the AMF-1 generates a GUTI-1, and the GUTI-1 is delivered to the terminal together with a registration completion message.

The terminal receives the GUTI-1. If eKSI sent by the AMF-1 to the terminal is the same as eKSI used by the terminal in the registration request message, the terminal can distinguish between different security contexts using the GUTI-1.

It should be noted that, when the solution shown in FIG. 7A, FIG. 7B, and FIG. 7C is applied to a scenario in which the terminal accesses an AMF of an operator A using the 3GPP access technology, accesses an AMF of an operator B using the non-3GPP access technology, and meanwhile maintains access on the 3GPP side. In this scenario, when the terminal accesses the AMF of the operator B again, the operator B needs to trigger an authentication procedure on the non-3GPP side. There are two triggering methods Manner 1: The terminal determines that an operator of the network accessed by the N3IWF is different from an operator of the network accessed using the 3GPP access technology. In this case, authentication needs to be performed on the terminal on the non-3GPP side again when access is being gained using the non-3GPP access technology. In this case, identification information carried in a registration request message sent by the terminal to the AMF is an SUCI.

The foregoing mainly describes the solutions provided in the embodiments of this application from a perspective of interaction between network elements. It can be understood that, to implement the foregoing functions, the network elements such as the terminal and the network device include corresponding hardware structures and/or software modules for performing the functions. A person skilled in the art should easily be aware that, with reference to units and algorithm steps in the examples described in the embodiments disclosed in this specification, this application can be implemented by hardware or a combination of hardware and computer software. Whether a function is performed by hardware or computer software driving hardware depends on particular applications and design constraints of the technical solutions. A person skilled in the art may use a different method to implement the described functions for each particular application, but it should not be considered that the implementation goes beyond the scope of this application.

In the embodiments of this application, division of functions module may be performed on the terminal and the network device based on the foregoing method examples. For example, each function module may be obtained through division in correspondence to each function, or at least two functions may be integrated into one processing module. The integrated module may be implemented in a form of hardware, or may be implemented in a form of a software function module. It should be noted that, module division in the embodiments of this application is an example, is merely logical function division, and may be other division in actual implementation. The following uses an example for description in which each function module is obtained through division in correspondence to each function.

Figure 8:
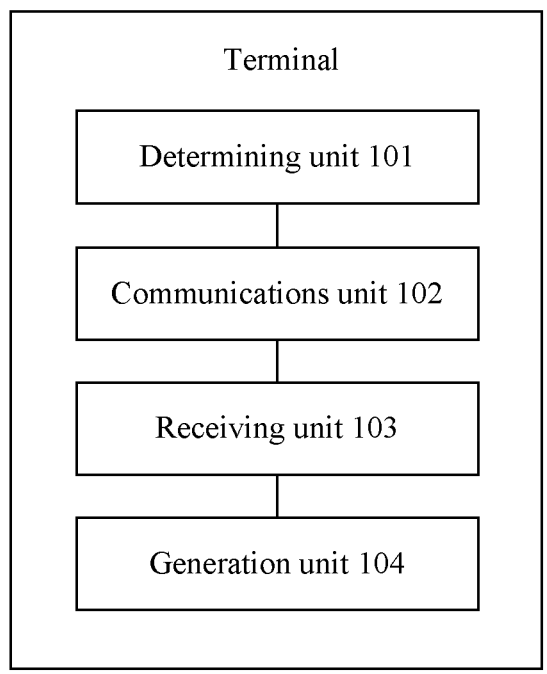
FIG. 8 is a schematic structural diagram of a terminal according to this application.

When an integrated unit is used, FIG. 8 is a possible schematic structural diagram of the terminal in the foregoing embodiments. The terminal includes a determining unit 101 and a communications unit 102. The determining unit 101 is configured to support the terminal in performing steps S101, S103, S104, S105, and S305 in the foregoing embodiments. The communications unit is configured to support the terminal in performing step S102 and step S301 in the foregoing embodiments. Optionally, the terminal further includes a receiving unit 103 and a generation unit 104. The receiving unit 103 is configured to support the terminal in performing steps S1031, S1041, S203, and S302 in the foregoing embodiments. The generation unit 104 is configured to support the terminal in performing steps S1032 and S1042 in the foregoing embodiments. In addition, the terminal further includes a sending unit configured to perform S303 and S306. All related content of various steps in the foregoing method embodiments may be cited in function descriptions of a corresponding function module. Details are not described herein again.

Figure 9:
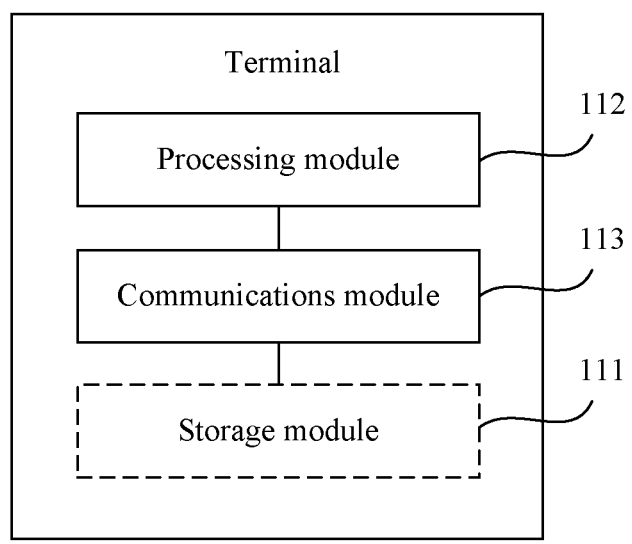
FIG. 9 is a schematic structural diagram of a terminal according to this application.

When an integrated unit is used, FIG. 9 is a possible schematic diagram of a logical structure of a terminal in the foregoing embodiments. The terminal includes a processing module 112 and a communications module 113. The processing module 112 is configured to control and manage an action of the terminal. For example, the processing module 112 is configured to support the terminal in performing steps S101, S103, S104, S105, S305, S1032, and S1042 in the foregoing embodiments. The communications module 113 is configured to support the terminal in performing steps S1031, S1041, S203, S302, S303, and S306 in the foregoing embodiments, and/or perform another process performed by the terminal in the technology described in this specification. The terminal may further include a storage module 111 configured to store program code and data of the terminal.

The processing module 112 may be a processor or a controller. For example, the processing module may be a central processing unit, a general-purpose processor, a digital signal processor, an application-specific integrated circuit, a field programmable gate array or another programmable logic device, a transistor logic device, a hardware component, or any combination thereof. The processing module 112 can implement or execute various example logical blocks, modules, and circuits described with reference to content disclosed in the embodiments of this application. Alternatively, the processor may be a combination of processors implementing a computing function, for example, one or a combination of microprocessors, or a combination of a digital signal processor and a microprocessor. The communications module 113 may be a transceiver, a transceiver circuit, a communications interface, or the like. The storage module 111 may be a memory.

Figure 10:
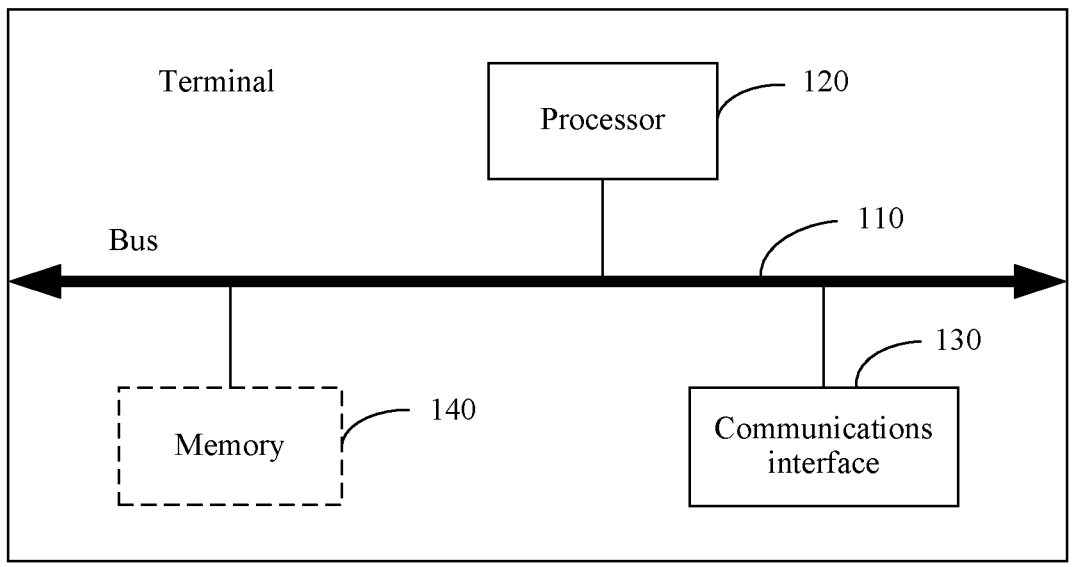
FIG. 10 is a schematic structural diagram of a terminal according to this application.

When the processing module 112 is a processor 120, the communications module 113 is a communications interface 130 or a transceiver, and the storage module 111 is a memory 140, the terminal in this application may be a device shown in FIG. 10.

The communications interface 130, at least one processor 120, and the memory 140 are connected to each other using a bus 110. The bus 110 may be a PCI bus, an EISA bus, or the like. The bus may be classified into an address bus, a data bus, a control bus, and the like. For ease of representation, the bus is represented using only one thick line in FIG. 10, but this does not mean that there is only one bus or only one type of bus. The memory 140 is configured to store program code and data of the terminal. The communications interface 130 is configured to support the terminal in communicating with another device (for example, a network device). The processor 120 is configured to support the terminal in executing the program code and the data that are stored in the memory 140, to implement the secure communication method provided in this application.

Figure 11:
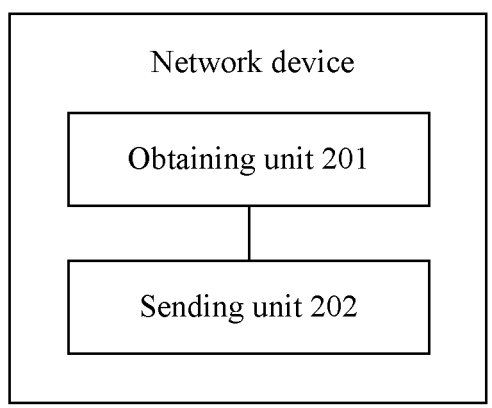
FIG. 11 is a schematic structural diagram of a network device according to this application.

When an integrated unit is used, FIG. 11 is a possible schematic structural diagram of a network device in the foregoing embodiments. The network device includes an obtaining unit 201 and a sending unit 202. The obtaining unit 201 is configured to support the network device in performing step S201 (which may be S2011 and S2012) and S204 in the foregoing embodiment. The sending unit 202 is configured to support the network device in performing step S202 (which may be S2021, S2022, S2023, and S2024) in the foregoing embodiment, and/or perform another process of the technology described in this specification. All related content of various steps in the foregoing method embodiments may be cited in function descriptions of a corresponding function module. Details are not described herein again.

Figure 12:
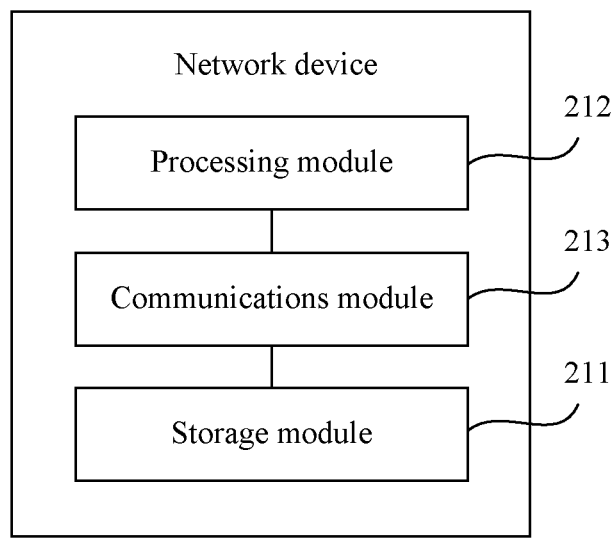
FIG. 12 is a schematic structural diagram of a network device according to this application.

When an integrated unit is used, FIG. 12 is a possible schematic diagram of a logical structure of the network device in the foregoing embodiments. The network device includes a processing module 212 and a communications module 213. The processing module 212 is configured to control and manage an action of the network device. For example, the processing module 212 is configured to support the network device in performing step S201 (which may be S2011 and S2012) and S204 in the foregoing embodiment. The communications module 213 is configured to support the network device in performing S202 (which may be S2021, S2022, S2023, and S2024) in the foregoing embodiment, and/or perform another process performed by the network device in the technology described in this specification. The network device may further include a storage module 211 configured to store program code and data of the network device.

The processing module 212 may be a processor or a controller. For example, the processing module may be a central processing unit, a general-purpose processor, a digital signal processor, an application-specific integrated circuit, a field programmable gate array or another programmable logic device, a transistor logic device, a hardware component, or any combination thereof. The processing module 212 can implement or execute various example logical blocks, modules, and circuits described with reference to content disclosed in the embodiments of this application. Alternatively, the processor may be a combination of processors implementing a computing function, for example, one or a combination of microprocessors, or a combination of a digital signal processor and a microprocessor. The communications module 213 may be a transceiver, a transceiver circuit, a communications interface, or the like. The storage module 211 may be a memory.

Figure 13:
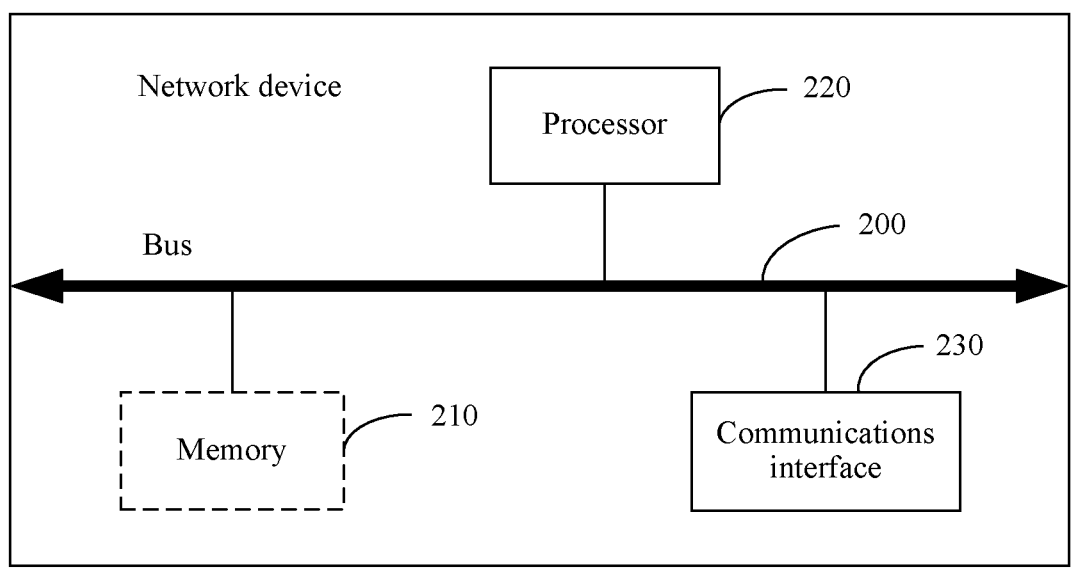
FIG. 13 is a schematic structural diagram of a network device according to this application.

When the processing module 212 is a processor 220, the communications module 213 is a communications interface 230 or a transceiver, and the storage module 211 is a memory 210, the network device in this application may be a device shown in FIG. 13.

The communications interface 230, at least one processor 220, and the memory 210 are connected to each other using a bus 200. The bus 200 may be a PCI bus, an EISA bus, or the like. The bus may be classified into an address bus, a data bus, a control bus, and the like. For ease of representation, the bus is represented using only one thick line in FIG. 13, but this does not mean that there is only one bus or only one type of bus. The memory 210 is configured to store program code and data of the network device. The communications interface 230 is configured to support the network device in communicating with another device (for example, a terminal). The processor 220 is configured to support the network device in executing the program code and the data that are stored in the memory 210, to implement the secure communication method provided in this application.

It should be noted that the receiving unit (or the unit for receiving) in this application may be an interface circuit of the secure communications apparatus and is configured to receive a signal from another apparatus. For example, when the secure communications apparatus is implemented in a chip manner, the receiving unit is an interface circuit of the chip and is configured to receive a signal from another chip or apparatus. The sending unit (or the unit for sending) is an interface circuit of the secure communications apparatus and is configured to send a signal to another apparatus. For example, when the secure communications apparatus is implemented in a chip manner, the sending unit is an interface circuit of the chip and is configured to send a signal to another chip or apparatus.

Figure 14:
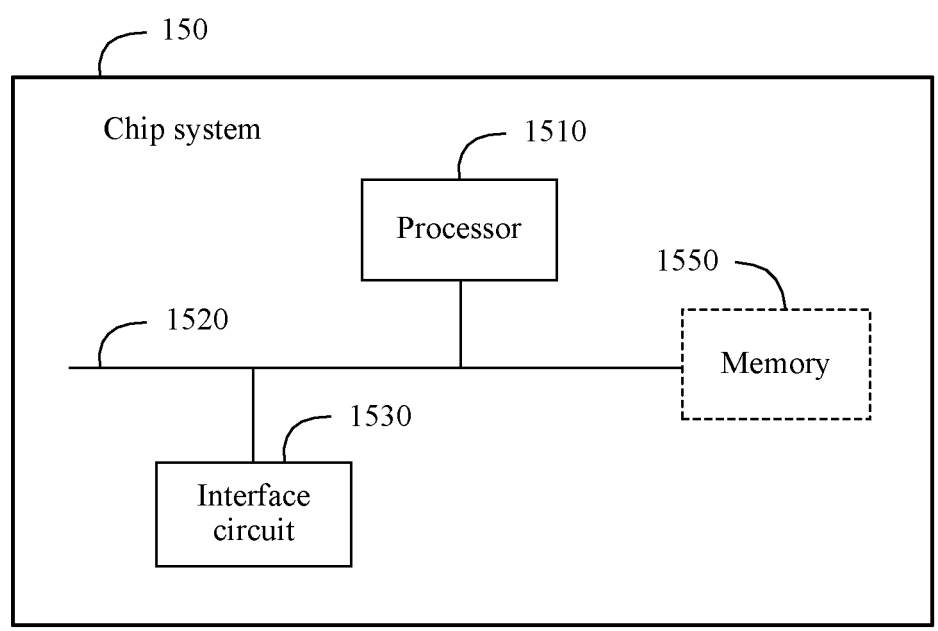
FIG. 14 is a schematic structural diagram of a chip system according to this application.

FIG. 14 is a schematic structural diagram of a chip system 150 according to an embodiment of this application. The chip system 150 includes at least one processor 1510 and an interface circuit 1530.

Optionally, the chip system 150 further includes a memory 1550. The memory 1550 may include a read-only memory and a random access memory, and provides an operation instruction and data for the processor 1510. A part of the memory 1550 may further include a non-volatile random access memory (NVRAM).

In some implementations, the memory 1550 stores the following elements: an executable module or a data structure, or a subset thereof, or an extended set thereof.

In this embodiment of this application, the processor 1510 performs a corresponding operation by invoking the operation instruction (the operation instruction may be stored in an operating system) stored in the memory 1550.

In a possible implementation, a structure of a chip system used by a terminal is similar to a structure of a chip system used by a network device, and different apparatuses may use different chip systems to implement respective functions.

The processor 1510 controls operations of the terminal and the network device, and the processor 1510 may also be referred to as a central processing unit (CPU). The memory 1550 may include a read-only memory and a random access memory, and provide an instruction and data for the processor 1510. A part of the memory 1550 may further include an NVRAM. In specific application, the processor 1510, the interface circuit 1530, and the memory 1550 are coupled together using a bus system 1520. In addition to a data bus, the bus system 1520 may include a power bus, a control bus, a status signal bus, and the like. However, for clear description, various types of buses in FIG. 14 are denoted as the bus system 1520.

The methods disclosed in the foregoing embodiments of this application may be applied to the processor 1510, or may be implemented by the processor 1510. The processor 1510 may be an integrated circuit chip and has a signal processing capability. In an implementation process, steps of the foregoing methods may be implemented using a hardware integrated logic circuit in the processor 1510, or using an instruction in a form of software. The processor 1510 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 1510 can implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished using a hardware decoding processor, or may be executed and accomplished using a combination of hardware in the decoding processor and software modules. The software module may be located in a mature storage medium in the art, such as a random access memory (RAM), a flash memory, a read-only memory (ROM), a programmable ROM (PROM), an electrically erasable PROM (EEPROM), or a register. The storage medium is located in the memory 1550, and the processor 1510 reads information from the memory 1550 and completes the steps of the foregoing methods in combination with hardware in the processor.

Optionally, the interface circuit 1530 is configured to perform the receiving and sending steps of the terminal and the network device in the embodiments shown in FIG. 3, FIG. 4, and FIG. 5.

The processor 1510 is configured to perform processing steps of the terminal and the network device in the embodiments shown in FIG. 3, FIG. 4, and FIG. 5.

In the foregoing embodiments, the instruction stored in the memory for execution by the processor may be implemented in a form of a computer program product. The computer program product may be written into the memory in advance, or may be downloaded and installed in the memory in a form of software.

The computer program product includes one or more computer instructions. When the computer program instruction is loaded and executed on a computer, the procedure or functions according to the embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, digital versatile disc (DVD)), a semiconductor medium (for example, a solid state disk (SSD)), or the like.

According to one aspect, a computer storage medium is provided. The computer-readable storage medium stores an instruction. When the instruction is run on a terminal, the terminal is enabled to perform S101, S103, S104, S105, S305, S1032, S1042, S1031, S1041, S203, S302, S303, and S306 in the embodiments, and/or perform another process performed by the terminal in the technology described in this specification.

According to another aspect, a computer storage medium is provided. The computer-readable storage medium stores an instruction. When the instruction is run on a network device, the network device is enabled to perform steps S201 (which may be S2011 and S2012), S204, and S202 (which may be S2021, S2022, S2023, and S2024) in the embodiment, and/or perform another process performed by the network device in the technology described in this specification.

According to one aspect, a computer program product including an instruction is provided. The computer program product stores an instruction. When the instruction is run on a terminal, the terminal is enabled to perform S101, S103, S104, S105, S305, S1032, S1042, S1031, S1041, S203, S302, S303, and S306 in the embodiments, and/or perform another process performed by the terminal in the technology described in this specification.

According to another aspect, a computer program product including an instruction is provided. The computer program product stores an instruction. When the instruction is run on a network device, the network device is enabled to perform S201 (which may be S2011 and S2012), S204, and S202 (which may be S2021, S2022, S2023, and S2024) in the embodiment, and/or perform another process performed by the network device in the technology described in this specification.

Moreover, this application further provides a communications system. The communications system includes the terminal shown in FIG. 8 to FIG. 10 and the network device shown in FIG. 11 to FIG. 13. In addition, the communications system may include another device that communicates with the terminal and the network device.

A person of ordinary skill in the art may be aware that, with reference to units and algorithm steps in the examples described in the embodiments disclosed in this specification, this application can be implemented by electronic hardware or a combination of computer software and electronic hardware. Whether these functions are performed by hardware or software depends on particular applications and design constraints of the technical solutions. A person skilled in the art may use a different method to implement the described functions for each particular application, but it should not be considered that the implementation goes beyond the scope of this application.

It can be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the solutions of the embodiments.

In addition, function units in the embodiments of this application may be integrated into one processing unit, or each of the units may exist alone physically, or at least two units may be integrated into one unit.

When functions are implemented in a form of a software function unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A secure communication method comprising:
   receiving a first non-access stratum (NAS) security mode command (SMC) message from an access and mobility management function (AMF), wherein the first NAS SMC message comprises a first message and first key identifier information, wherein the first message comprises an indication that an Extensible Authentication Protocol authentication and key agreement (EAP-AKA') authentication on a terminal has succeeded, wherein the indication is configured to trigger generation of first security to verify the NAS SMC message, wherein the first key identifier information identifies a first security context, and wherein the first security context comprises the first key identifier information and a parameter protecting a message transmitted between the terminal and a first network; and generating the first security context based on the indication.

2. The secure communication method of claim 1, wherein the first message is an Extensible Authentication Protocol success (EAP-Success) message.

3. The secure communication method of claim 1, wherein the first key identifier information is a key identifier.

4. The secure communication method of claim 1, further comprising receiving the first key identifier information from the AMF in a second NAS SMC message for transferring an authentication vector.

5. The secure communication method of claim 1, wherein the AMF is of the first network, and wherein the secure communication method further comprises:

receiving a second NAS SMC message from a second network device of a second network, wherein the second NAS SMC message comprises second key identifier information identifying a second secure context; and generating the second security context, wherein the second security context comprises the second key identifier information and a parameter protecting a message transmitted between the terminal and the second network.

6. A secure communication method implemented by an access and mobility management function (AMF) and comprising:

determining an Extensible Authentication Protocol authentication and key agreement (EAP-AKA') authentication on a terminal has been completed on a network side; and sending a non-access stratum (NAS) security mode command (SMC) message to the terminal, wherein the NAS SMC message comprises a first message and first key identifier information, wherein the first message comprises an indication that the EAP-AKA' authentication has succeeded, wherein the indication is configured to trigger generation of first security to verify the NAS SMC message, and wherein the first key identifier information identifies a first security context.

7. The secure communication method of claim 6, wherein the first message is an Extensible Authentication Protocol success (EAP-Success) message.

8. The secure communication method of claim 6, wherein the first key identifier information is a key identifier.

9. The secure communication method of claim 6, wherein before sending the NAS SMC message, the secure communication method further comprises generating the first key identifier information in a process of performing the EAP-AKA' authentication.

10. The secure communication method of claim 9, further comprising sending the first key identifier information to the terminal in a second NAS SMC message for transferring an authentication vector.

11. An apparatus comprising:

a memory configured to store instructions; and a processor coupled to the memory and configured to execute the instructions to cause the apparatus to:

receive a first non-access stratum (NAS) security mode command (SMC) message from an access and mobility management function (AMF), wherein the first NAS SMC message comprises a first message and first key identifier information, wherein the first message comprises an indication that an Extensible Authentication Protocol authentication and key agreement (EAP-AKA') authentication on a terminal has succeeded, wherein the indication is configured to trigger generation of first security to verify the NAS SMC message, wherein the first key identifier information identifies a first security context, and wherein the first security context comprises the first key identifier information and a parameter protecting a message transmitted between the terminal and a first network; and generate the first security context based on the indication.

12. The apparatus of claim 11, wherein the first message is an Extensible Authentication Protocol success (EAP-Success) message.

13. The apparatus of claim 11, wherein the first key identifier information is a key identifier.

14. The apparatus of claim 11, wherein the processor is further configured to execute the instructions to cause the apparatus to receive the first key identifier information from the AMF in a second NAS SMC message for transferring an authentication vector.

15. The apparatus of claim 11, wherein the AMF is of the first network, and wherein the processor is further configured to execute the instructions to cause the apparatus to:

receive a second NAS SMC message from a second network device of a second network, wherein the second NAS SMC message comprises second key identifier information identifying a second secure context; and generate the second security context, wherein the second security context comprises the second key identifier information and a parameter protecting a message transmitted between the terminal and the second network.

16. An access and mobility management function (AMF) comprising:

a memory configured to store instructions; and a processor coupled to the memory and configured to execute the instructions to cause the AMF to:

determine an Extensible Authentication Protocol authentication and key agreement (EAP-AKA') authentication on a terminal has been completed on a network side; and send a non-access stratum (NAS) security mode command (SMC) message to the terminal, wherein the NAS SMC message comprises a first message and first key identifier information, wherein the first message comprises an indication that the EAP-AKA' authentication has succeeded, wherein the indication is configured to trigger generation of first security to verify the NAS SMC message, and wherein the first key identifier information identifies a first security context.

17. The AMF of claim 16, wherein the first message is an Extensible Authentication Protocol success (EAP-Success) message.

18. The AMF of claim 16, wherein the first key identifier information is a key identifier.

19. The AMF of claim 16, wherein the processor is further configured to execute the instructions to cause the AMF to generate, before sending the NAS SMC message, the first key identifier information in a process of performing the EAP-AKA' authentication.

20. The AMF of claim 19, wherein the processor is further configured to execute the instructions to cause the AMF to send the first key identifier information to the terminal in a second NAS SMC message for transferring an authentication vector.

\* \* \* \* \*